United States Patent
Yu

(10) Patent No.: US 8,214,185 B2
(45) Date of Patent: Jul. 3, 2012

(54) STABILITY PERFORMANCE OF THE COUPLED ALGORITHMS FOR VISCOELASTIC INK JET SIMULATIONS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 745 days.

(21) Appl. No.: 12/351,317

(22) Filed: Jan. 9, 2009

(65) Prior Publication Data
US 2009/0119081 A1    May 7, 2009

Related U.S. Application Data

(63) Continuation-in-part of application No. 11/205,441, filed on Aug. 17, 2005, now Pat. No. 7,478,023.

(60) Provisional application No. 60/680,747, filed on May 13, 2005, provisional application No. 60/684,763, filed on May 25, 2005.

(51) Int. Cl.
*G06F 7/48* (2006.01)

(52) U.S. Cl. .............. 703/9; 347/6; 347/17; 427/64; 427/258

(58) Field of Classification Search ............ 703/9, 10; 347/6, 17; 427/64
See application file for complete search history.

(56) References Cited

U.S. PATENT DOCUMENTS

| 7,478,023 | B2 * | 1/2009 | Yu ........................ 703/9 |
|---|---|---|---|
| 2003/0060988 | A1 | 3/2003 | Ginzburg |
| 2004/0131778 | A1 | 7/2004 | Verhoest et al. |
| 2004/0181383 | A1 * | 9/2004 | Yu et al. .................. 703/9 |
| 2005/0022895 | A1 | 2/2005 | Barth et al. |
| 2005/0046649 | A1 * | 3/2005 | Yu et al. .................. 347/6 |
| 2005/0084605 | A1 * | 4/2005 | Kathirgamanathan .... 427/64 |
| 2005/0179715 | A1 * | 8/2005 | Merz et al. ............ 347/17 |
| 2006/0169800 | A1 | 8/2006 | Rosell et al. |
| 2006/0259288 | A1 * | 11/2006 | Yu ........................ 703/9 |
| 2006/0277011 | A1 * | 12/2006 | Tardy et al. ............. 703/10 |
| 2008/0103742 | A1 * | 5/2008 | Yu ........................ 703/9 |

OTHER PUBLICATIONS

Ervin et al., "Approximation of time-dependent, multi-component viscoelastic fluid flow", Computational methods in Applied Mechanics and Engineering, 2005.*
Markus et al., Analysis of spurt phenomena for non-Newtonuian fluid, 1990.*
Miles, W.W., "modeling time dependent, muti-component, viscoelastic fluid flow", Clemson University, 2002.*
Pillapakkam et al., "A level set method for computing solutions to viscoelastic two phase flow", Journal of Computational Physics, 2001.*

(Continued)

*Primary Examiner* — Kandasamy Thangavelu

(57) ABSTRACT

A system and method for simulating the flow of a viscoelastic fluid through a channel. The simulation including a interface between a first fluid and a second fluid. The simulation including the formation of a droplet. The simulation includes solving equations governing the viscoelastic flow of the first fluid through the channel, including viscoelastic stress equations that include a normalized relaxation time greater than or equal to 5. The calculations simulate the flow of the first fluid through the channel. The simulation is stable over a period time in which a droplet is formed. The simulation including a level set function that describes the position of the interface between the first and second fluids, and the evolution of the level set function over time describes the shape and position of the interface.

13 Claims, 8 Drawing Sheets

Droplet Ejection λ = 5

0μs  5.8μs  16.8μs  27.8μs  38.8μs  49.8μs  60.8μs  71.8μs

OTHER PUBLICATIONS

Sureshkumar et al., "Linear stability and dynamics of viscoelastic flows using time-dependent numerical simulation", Journal of Non-Newtonian Fluid Mechanics, 1998.*

Onuki, A., "Phase transitions of fluids in shear flow", Journal of Physics, 1997.*

Dimitropoulos et al., "Direct numerical simulationof viscoelastic turbulent channel flow exhibiting drag reduction..", Journal of Non-Newtonian fluifd mechanics, 1998.*

Tirtaatmadja, V., et. al., "Drop formation and breakup of low viscosity elastic fluids: Effects of molecular weight and concentration", American Institute of Physics, pp. 1-18, Jan. 2006.

Saramito, P., "Efficient simulation of nonlinear viscoelastic fluid flows", Elsevier, Journal of Non-Newtonian Fluid Mechanics, pp. 199-223, Jun. 13, 1995.

Funada, T., et al., "Viscoelastic potential flow analysis of capillary instability", Elsevier, Journal of Non-Newtonian Fluid Mechanics, pp. 87-105, Jan. 2003.

Keshtiban, I. J., et al., "Compution of incompressible and weakly-compressible viscoelastic liquids flow: finite element/volume schemes", Elsevier, Journal of Non-Newtonian Fluid Mechanics, pp. 123-143, Jan. 2005.

Davidson, M. R., et al., "Simulations of pendant drop formation of a viscoelastic liquid", Korea-Austrralia Rheology Journal, vol. 18, No. 2, pp. 41-49, Jun. 2006.

Osher, S., et al., "Fronts Propagating with Curvature-Dependent Speed: Algorithms Based on Hamilton-Jacobi Formulations", Journal of Computational Physics 79, pp. 12-49, Jan. 1988.

Yu, J, et al., "A Coupled Quadrilateral Grid Level Set Projection Method applied to Ink Jet Simulation", Elsevier, Journal of Computational Physics, pp. 227-251, Jan. 25, 2005.

Sakai, S., "Dynamics of Piezoelectric Inkjet Printing Systems", IS&T's NIP16: 2000 International Conference on Digital Printing Technologies, pp. 15-20, Jan. 2000.

* cited by examiner

STABILITY PERFORMANCE OF THE COUPLED ALGORITHMS FOR VISCOELASTIC INK JET SIMULATIONS

CROSS-REFERENCE TO RELATED APPLICATIONS

This application claims priority under 35 U.S.C. §120 as a continuation-in-part of U.S. application Ser. No. 11/205,441 filed on Aug. 17, 2005, which claims the benefit of U.S. Provisional Application No. 60/680,747 filed May 13, 2005 and U.S. Provisional Application No. 60/684,763 filed May 25, 2005 under 35 U.S.C. §119(e). The contents of all above-referenced applications are incorporated by reference herein in their entirety.

BACKGROUND

1. Field of the Invention

The present invention relates to finite difference algorithms and associated models for viscoelastic ink ejection simulation.

2. Description of the Related Art

Results of ink-jet simulations are useful in the design of piezoelectric ink-jet print heads. A practical ink-jet simulation may be carried out using an analytical tool such as an equivalent circuit that receives as an input the dynamic voltage to be applied to a piezoelectric actuator and simulates the ink behavior under the influence of the ink cartridge, supply channel, vibration plate, and actuator. That is, from the input voltage and an ink flow rate, the equivalent circuit calculates an inflow pressure that drives computational fluid dynamics (CFD) code. The CFD code then solves the governing partial differential equations, i.e., the incompressible Navier-Stokes equations for two-phase flows, for fluid velocity, pressure, and interface position, and feeds back the ink flow rate to the equivalent circuit. The sequence is repeated as long as needed.

The dynamics of fluid flow through the ink-jet nozzle, coupled to surface tension effects along the ink-air interface and boundary conditions along the wall, act to determine the shape of the interface as it moves. Designing the CFD code largely involves taking into account the dynamically changing ink-air interface, which can be quite challenging.

One method that has been used to model the ink-air interface is the volume of fluid method (VOF). The VOF method performs mass conservation fairly well but has problem accurately modeling surface tension aspects of fluid flow, especially when the ink droplet is very small, as in less than 5 picoliters. The ability to eject small ink droplets is essential for photo quality ink-jet printers. The VOF method has given way to improved modeling methods, which include level set methods that are better at accurately capturing the ink-air interface in CFD simulations than the VOF method. There is an explicit relationship between the level set, the interface curvature, and the surface tension. This relationship allows the level set method to excel whenever surface tension is important.

Level set methods may make use of the finite element method. One problem with using the finite element method when applied to the level set method is the inability of the finite element method to accurately and effectively conserve the mass of the fluid being simulated. Finite difference analysis is better at conserving the mass of the fluid being simulated.

The dynamics of fluid flow are further complicated when the fluid is viscoelastic in nature. A viscoelastic fluid may be characterized by several parameters including, density, viscosity, elastic modulus, and others. A variety of numerical models are used to describe viscoelastic fluids including the Maxwell model, the Kelvin-Voigt model, Generalized Maxwell Model, the Standard Linear Solid Model, and the Oldroyd-B model.

The viscosity and the elastic modulus may be combined to give a relaxation time. The relaxation time of a viscoelastic fluid characterizes the amount of time it takes the fluid to dissipate elastic energy stored in the fluid. The relaxation time is normalized relative to the time period of the observation of the numerical experiment. The normalized relaxation time is referred to as the Deborah number. Prior art methods that attempted simulate the jettability of a viscoelastic fluid would only work when the Deborah number was less than 3.

The present invention is directed towards a method of simulating a viscoelastic fluid when the Deborah number is greater than 3.

SUMMARY OF THE INVENTION

An embodiment of the present invention is a method using a central processing unit to simulate and analyze the flow of a viscoelastic fluid through a channel. In which the simulation includes an interface between a first fluid that flows through the channel and a second fluid. The simulation also includes the formation of a droplet.

The present invention includes calculations to solve equations governing the viscoelastic flow of the first fluid through the channel. The equations include viscoelastic stress equations and a normalized relaxation time greater than or equal to 5. The calculations to simulate the flow of the first fluid through the channel are stable over a period time in which a droplet is formed.

The present invention includes updating periodically during the simulation a level set function for the first and second fluids. The level set function describes the position of the interface between the first and second fluids. The evolution of the level set function over time describes the shape and position of the interface over time.

An embodiment of the present invention is a computer readable storage medium encoded with instructions for performing the simulation. An embodiment of the present invention is a system including a central processing unit and memory configured to perform the simulation. An embodiment of the present invention includes a visual display of the level set function.

An embodiment of the present invention includes designing an ink-jet print head using the results of the simulation of the viscoelastic fluid. An embodiment of the present invention is a method in which the normalized relaxation time is normalized relative to the width of an opening of the channel. An embodiment of the present invention is a method in which the normalized relaxation time is normalized relative to a velocity scale. An embodiment of the present invention is a method of claim 1, wherein the simulation is performed by an algorithm that is explicit on an advection term, semi-implicit on a viscosity term, and implicit on a relaxation term.

An embodiment of the present invention is a method in which the droplet is formed, does not pinch off, and the simulation is stable over a period of time that includes the formation of the droplet an extension of the droplet above an initial interface, and a retraction of the droplet towards the initial interface.

An embodiment of the present invention is a method in which the normalized relaxation time is the Weissenberg number of the fluid. An embodiment of the present invention is a method in which the normalized relaxation time is greater than or equal to 10. An embodiment of the present invention is a method in which the normalized relaxation time is the Deborah number of the fluid. An embodiment of the present invention is a method in which a finite difference method is used in to perform the simulation.

An embodiment of the present invention is a method that is considered to be stable when the time step is greater than the mesh size raised to the power of the order of the approximation.

An embodiment of the present invention is a method that is considered to be stable when the time step is greater than or equal to the product of a safety factor and a mesh size raised to the power of the order of the approximation. In an embodiment of the present invention the safety factor is selected from the group consisting of 5, 10 and 20.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention is a stable method of simulating the flow of a viscoelastic fluid when the relaxation time of the fluid is large. The present invention may be used to simulate the ejection of a fluid from an ink jet nozzle. Although the present invention is presented in the context of a simulation of an ink-jet nozzle an individual skilled in the art would appreciate that the present invention may be adapted to also simulate the flow of a viscoelastic fluid in the production and processing steps of various viscoelastic fluids like plastics, rubber, glass, biomaterials and other fluids that exhibit viscoelastic behavior.

Figure 1:
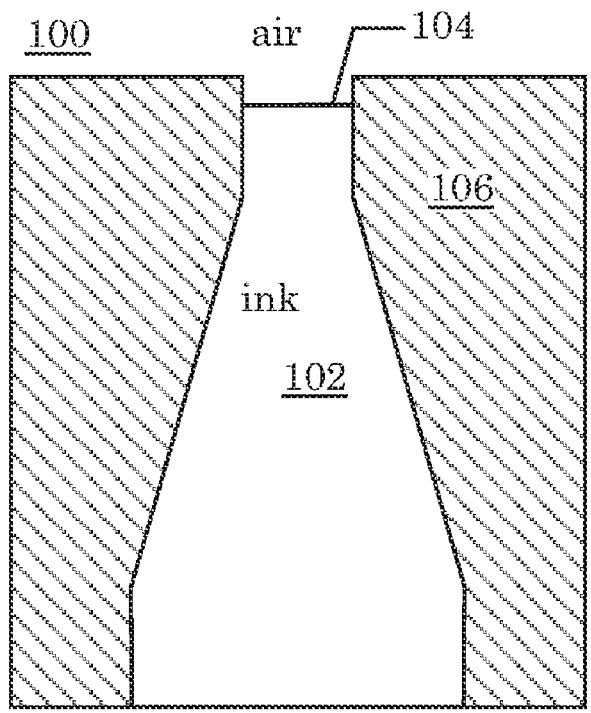
FIG. 1 is an illustration of an ink-jet nozzle.

FIG. 1 is an illustration of a radial slice of a typical ink-jet nozzle 106. The geometry of the nozzle 106 may be axisymmetric. FIG. 1 is an illustration of an ink jet nozzle's geometry and is not drawn to scale. Ink 102 is stored in a cartridge, and driven through the nozzle 106 in response to a dynamic pressure applied at the lower boundary, i.e., the nozzle inlet. An interface 104 exists between the ink 102 and air 100. The dynamics of incompressible viscoelastic fluid flow, coupled with surface tension effects along the ink-air interface 104 and boundary conditions along the wall, act to determine the shape of the interface 104 as it moves through the nozzle. A negative pressure at the lower boundary induces a backflow, which causes a bubble of ink 102 to pinch off and move through the domain.

The fluid of a dye-based ink used in an ink-jet printer may be treated as a Newtonian fluid. In a Newtonian fluid, there is a linear relationship between a fluid's stress tensor and a fluid's rate of deformation tensor and is not related to any other instant. A method for simulating a Newtonian fluid is described in U.S. patent application Ser. No. 10/390,239 filed on Mar. 14, 2003, which is hereby incorporated by reference in its entirety.

Some pigment-based inks have better color durability than dye-based inks. These pigment-based inks do not behave like a Newtonian fluid. Pigment-based inks, as well as inks used in industrial printing applications, are often best described as a viscoelastic fluid. In a viscoelastic fluid, the relationship between the stress tensor of the fluid and the rate of deformation tensor at any particular instant depends on the deformation history. Viscoelastic inks and Newtonian inks having the same dynamic viscosity may behave very differently in terms of jettability and other ink-jet performance characteristics.

The relaxation time of a viscoelastic fluid is a parameter that characterizes the amount of time that the viscoelastic fluid is dependent upon the deformation history. The greater the relaxation time the harder it is to simulate the flow of the viscoelastic fluid.

Figure 2:
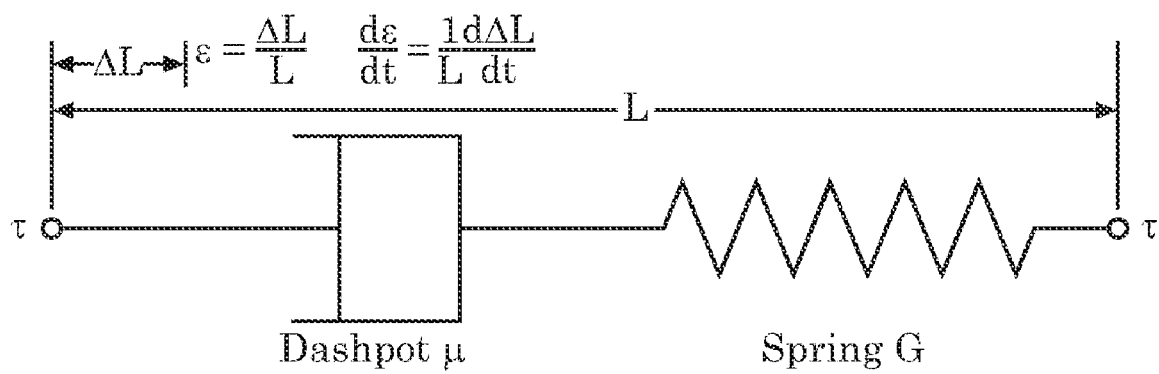
FIG. 2 is an illustration of a mechanical model analogous to a viscoelastic fluid.

In 1867, James Clerk Maxwell introduced a mathematical model of a gas that was both viscous and elastic. Over time, the Maxwell model has been further described as a linear combination of a spring and dashpot whose stress strain relationship is similar to the stress strain relationship of a viscoelastic fluid, and is shown in FIG. 2. Equation (1) is a stress strain relationship for a simple Maxwell model of a viscoelastic fluid shown in FIG. 2, where $\tau$ is the stress, $\epsilon$ is the strain, $\mu$ is the dynamic viscosity, and G is the elastic constant. Equation (1), assumes that both the spring and the dashpot are linear.

$$\frac{1}{G}\frac{d\tau}{dt} + \frac{1}{\mu}\tau = \frac{d\varepsilon}{dt} \quad (1)$$

In order to simplify, equation (1), the following variables are defined.

$$\lambda = \frac{\mu}{G}$$

$$s = G\frac{d\varepsilon}{dt}$$

The new variable s is representative of the rate of deformation of the fluid, scaled with respect to the elastic constant. The new variable $\lambda$ is the relaxation time of the viscoelastic fluid. We can now form a simplified equation (2).

$$\frac{d\tau}{dt} + \frac{1}{\lambda}\tau = s \quad (2)$$

Equation (2) describes a relationship between the stress $\tau$ at a given instant on both the rate of deformation s and the rate of change of the stress $\tau$. If a viscoelastic fluid has a long relaxation time $\lambda$, the fluid behaves very differently from a Newtonian fluid. For a Newtonian fluid, the material model does not have the spring. The constitutive relation for a Newtonian fluid is simply:

$$\tau = \mu\frac{d\varepsilon}{dt} \quad (3)$$

An embodiment of the present invention may be based on a continuum mechanics version of the Maxwell model such as the Oldroyd-B model. In an embodiment of the present invention, the dynamic viscosity and relaxation time are constant. The present invention is described in terms of a two-phase immiscible incompressible flow in the presence of surface tension and a density jump across an interface separating a viscoelastic fluid (ink) and a Newtonian fluid (air). An individual skilled in the art will appreciate that the present invention may be used to simulate other fluid systems and other simulation models. An embodiment of the present invention may include a macroscopic slipping contact line model that describes the dynamics of air-ink-wall boundary.

An embodiment of the present invention is a finite difference method for simulating the flow of a viscoelastic fluid that is first order accurate in time. An alternative embodiment of the present invention is second order accurate in time. Embodiments of the present invention are stable over a wide range of relaxation times.

An embodiment of the present invention may incorporate some or all of: a coupled level set projection method for an incompressible immiscible two-phase fluid flow; a high order Godunov type algorithm for convection terms in momentum equations and the level set convection equation; a central difference method for viscosity, surface tension, and upper-convected derivative terms; and an equivalent circuit for inflow pressure (or inflow rate). In an embodiment of the present invention that is first order accurate in time may include, a first order upwind algorithm designed for the convection term in the viscoelastic stress equations. An embodiment of the present invention that is second order accurate in time may include a second order Godunov upwind method for the convection term in the viscoelastic stress equations.

The present invention is directed towards the effect of large normalized relaxation times, $\lambda > 3$. Under typical nozzle geometry and typical driving conditions, droplets of viscoelastic fluid do not pinch off if the normalized relaxation time is greater than 1, $\lambda > 1$. The present application provides evidence that an embodiment of the present invention is capable of simulating fluid flow when the normalized relaxation time exceeds 3. A simulation code based on the present invention has been used to simulate the ejection of viscoelastic fluid under typical driving conditions and nozzle geometry. Prior art simulation codes have experienced stability problem when simulating highly viscoelastic fluid flows. Both of our algorithms are pretty stable. However, the stability performances of the first-order and second-order algorithms are different. We found the 2nd-order algorithm is much more stable than the first order one. The difference will be shown in terms of the range of relaxation time.

Stability Performance

The stability performance of the present invention may be checked by testing the stability of an embodiment of the present invention on a typical geometry such as that shown in FIG. 1. An embodiment of the present invention was tested on a simulated nozzle with a diameter of 25 microns at the opening and 49.5 microns at the nozzle inlet. The length of the nozzle opening section, where the diameter is 25 microns, is 26 microns. The length of the slanted section as shown in FIG. 1 is 55 microns and the length of the nozzle inlet section is 7.5 microns.

Figure 3:
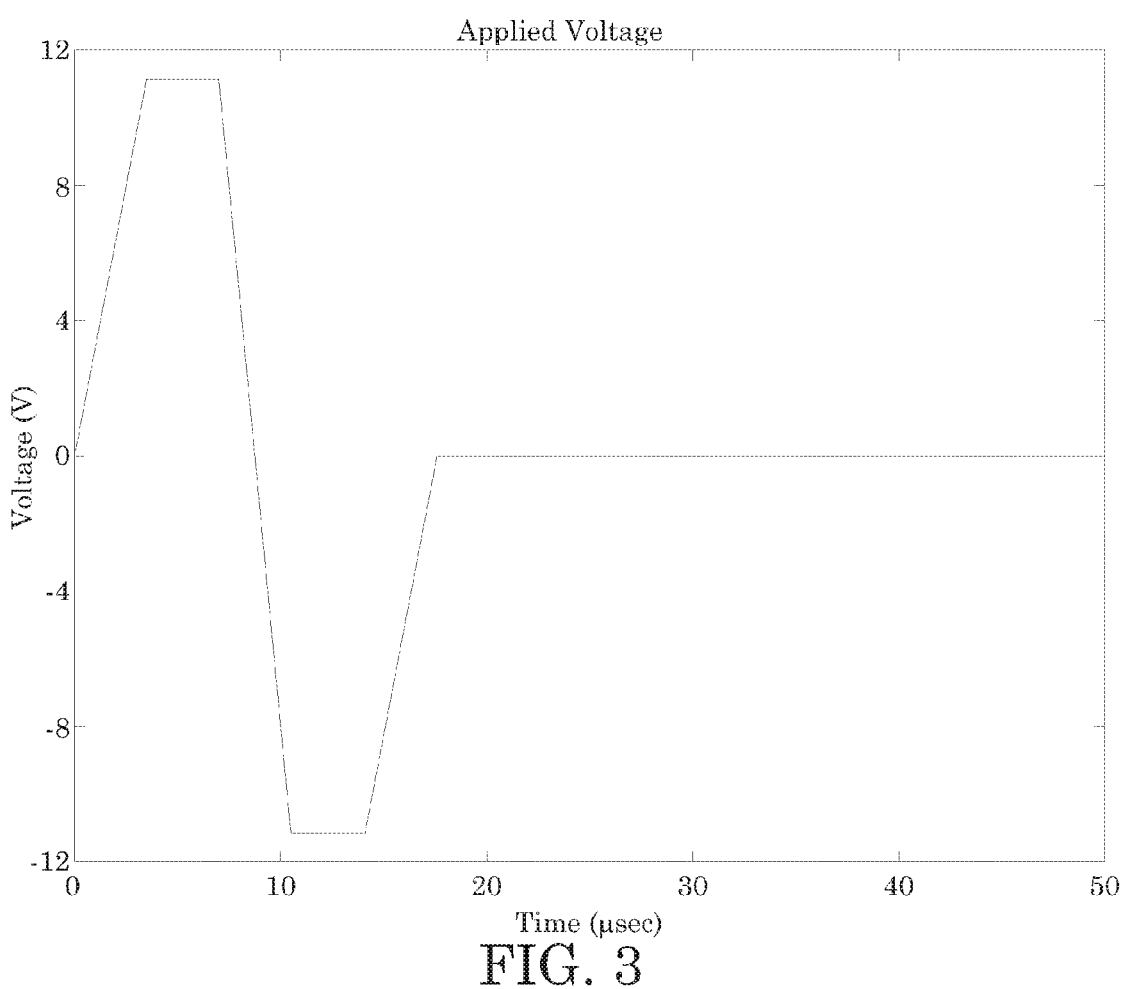
FIG. 3 is an illustration of the dynamic input voltage.
Figure 4:
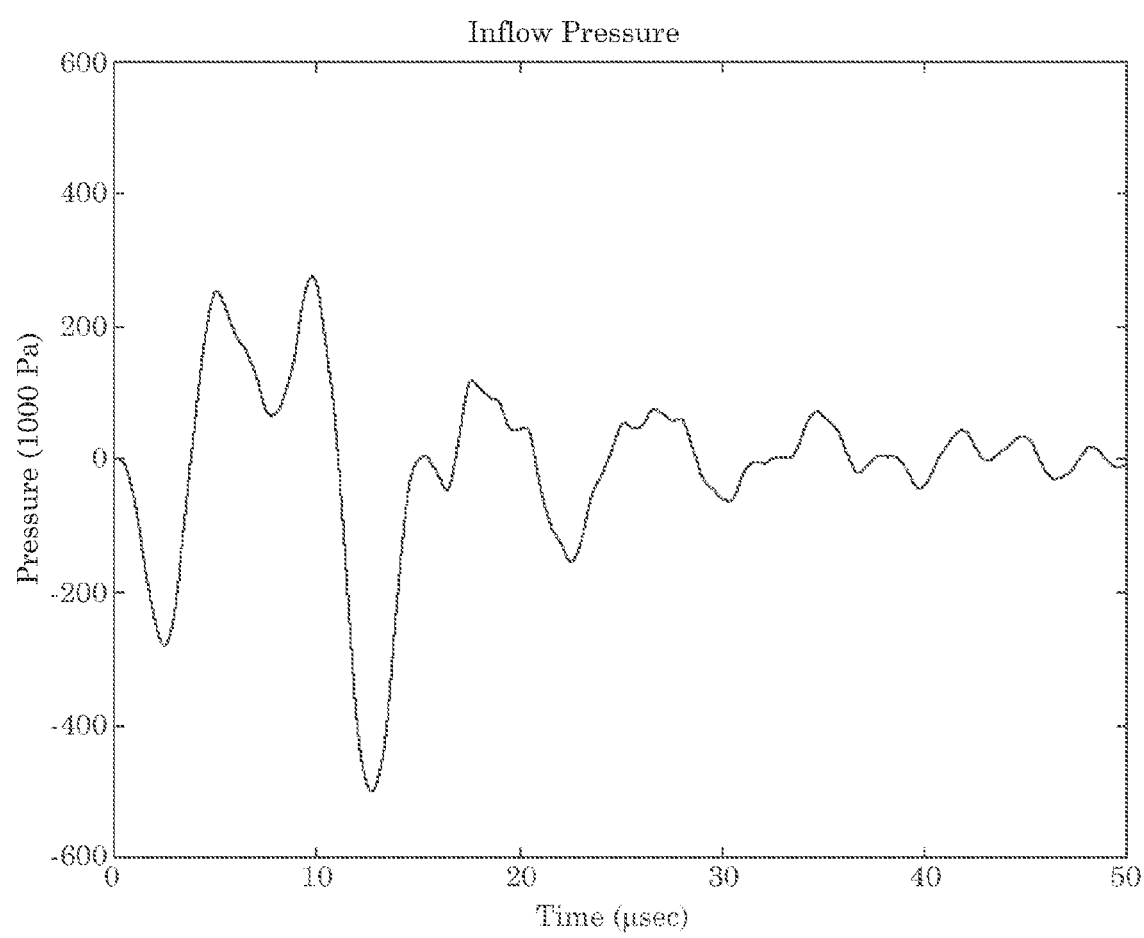
FIG. 4 is an illustration of the dynamic input pressure.

In the simulated nozzle, the inflow pressure may be given by an equivalent circuit that simulates the effect of: the ink cartridge; the supply channel; the vibration plate; the PZT actuator; the applied voltage; the ink in the channel; and the ink in the cartridge. FIG. 3 is an illustration of the dynamic input voltage with peak voltages at ±11.15 volts. The dynamic inflow pressure corresponding to the dynamic input voltage for a viscoelastic fluid is illustrated in FIG. 4 and is similar to that of a Newtonian fluid. The outflow pressure at the top of the solution domain is set to zero.

The solution domain for the simulated nozzle is $\{(r,z) | 0 \leq r \leq 27.3 \ \mu m, \ 0 \leq z \leq 725 \ \mu m\}$. The height of the solution domain above the nozzle is greater than the height of comparable solution domain in which the fluid is Newtonian. An individual skilled in the art can appreciate that the solution domain for a viscoelastic fluid is selected to take into account the length of the droplet produced by viscoelastic ink. An individual skilled in the art would appreciate that the solution domain is adapted to take into account the properties of the fluid.

In the simulated nozzle, the advancing contact angle is 70 and the receding contact angle is 20. In the simulated nozzle, the initial meniscus is flat and is 3.5 microns lower than the nozzle opening. An individual skilled in the art would appreciate that other simulation parameters may be chosen without going beyond the spirit and scope of the present invention.

An individual skilled in the art will appreciate that the scaling of any simulation problem is important. If the scaling is incorrect, round off error accumulates making it impossible to obtain stable results. In an embodiment of the present invention, a length scale and a velocity scale are used to normalize the solution domain. An individual skilled in the art will appreciate that other scales may be used without going beyond the scope of the present invention.

In an embodiment of the present invention, the length scale is the diameter of the nozzle opening, which in the case of the simulated nozzle is 25 microns. In which case the normalized solution domain is $\{(r,z) | 0 \leq r \leq 1.092, \ 0 \leq z \leq 29\}$. An individual skilled in the art will appreciate that the length scale, need not be exactly equal to the nozzle diameter but should be on the same order of magnitude. In the context of the present invention, the same order of magnitude is equal to $\frac{1}{10}$ or 10 times the reference value. In an alternative embodiment of the present invention, the length scale is the same order of magnitude as the droplet ejected by the nozzle.

In an embodiment of the present invention, an additional length scale is used to normalize the simulation space. In an embodiment of the present invention the velocity scale is 6 meters/second. An individual skilled in the art will appreciate that the exact value of the velocity scale is not as important as the order of magnitude the velocity scale. In an embodiment of the present invention, the velocity scale is on the same order of magnitude as the maximum expected velocity of the fluid being simulated. In alternative embodiment of the present invention the velocity scale is on the order of magnitude of: an exit velocity of a droplet, a maximum velocity of a droplet, a mean velocity of a droplet, a mean velocity of a fluid.

The properties of the fluid used in the simulated nozzle used to showcase the stability of the present invention are: a density of $\rho_1 = 1070$ kg/m$^3$; a solvent viscosity of $\mu_1 = 1.750 \times 10^{-3}$ kg/m·sec$^3$; a solute viscosity of $\mu_p = 1.750 \times 10^{-3}$ kg/m·sec$^3$; and a surface tension of $\sigma = 0.032$ kg/sec$^2$. The non-dimension parameters of the fluid are: a Reynolds number based on the solvent viscosity Re=91.71; a Weber number of the fluid is We=30.09; and a Reynolds number based on the solute viscosity Re$_p$=91.71. The density of the air is $\rho_2 = 1.225$ kg/m$^3$ and the viscosity of the air is $\mu_2 = 1.77625 \times 10^{-3}$ kg/m·sec$^3$.

Figure 5:
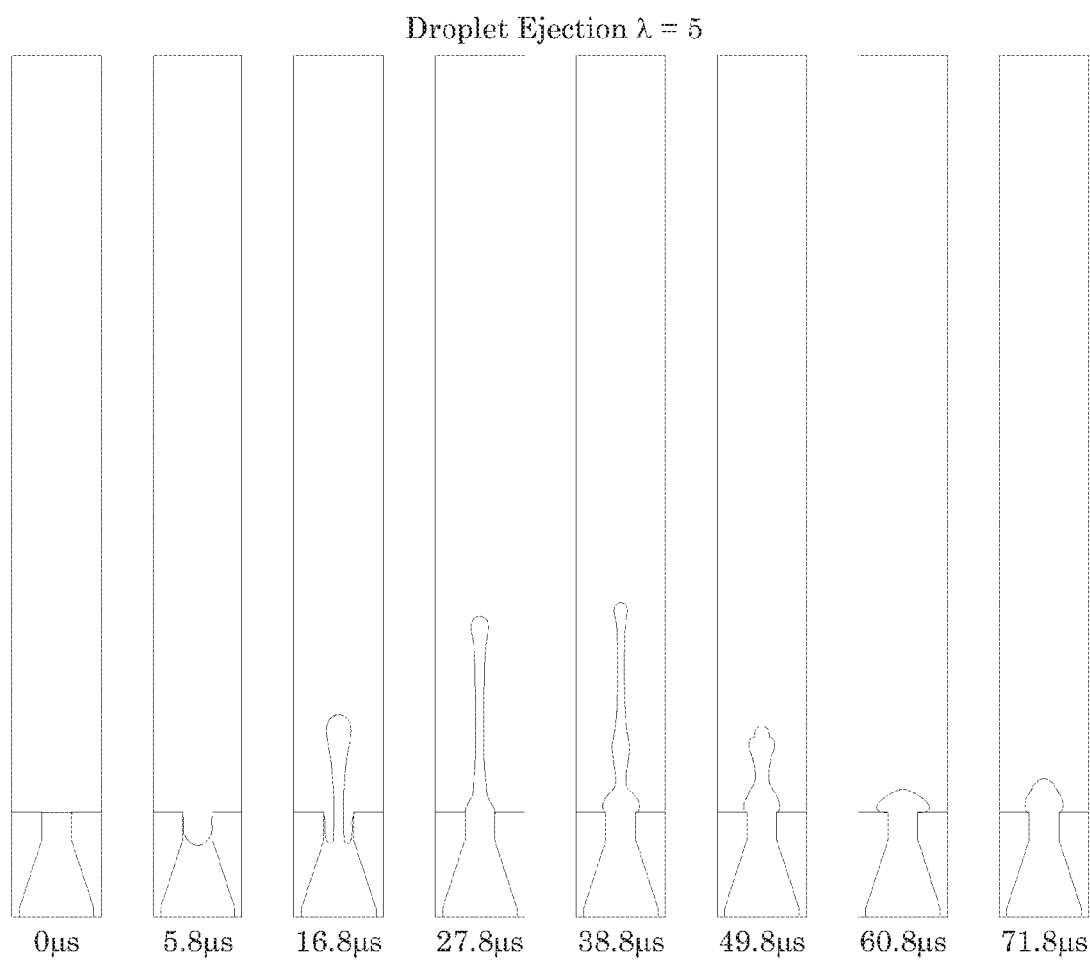
FIGS. 5-8 are illustrations of the droplet shapes.
Figure 6:
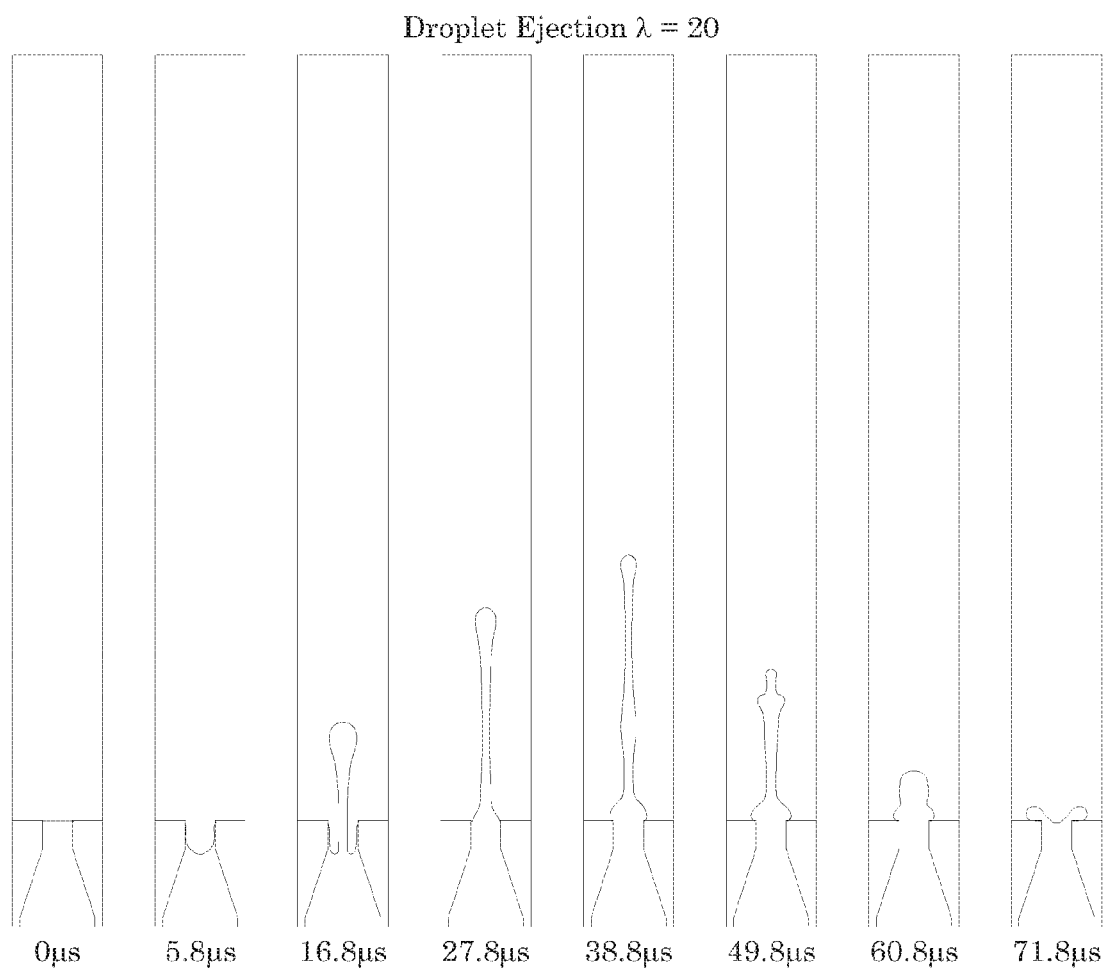
Figure 7:
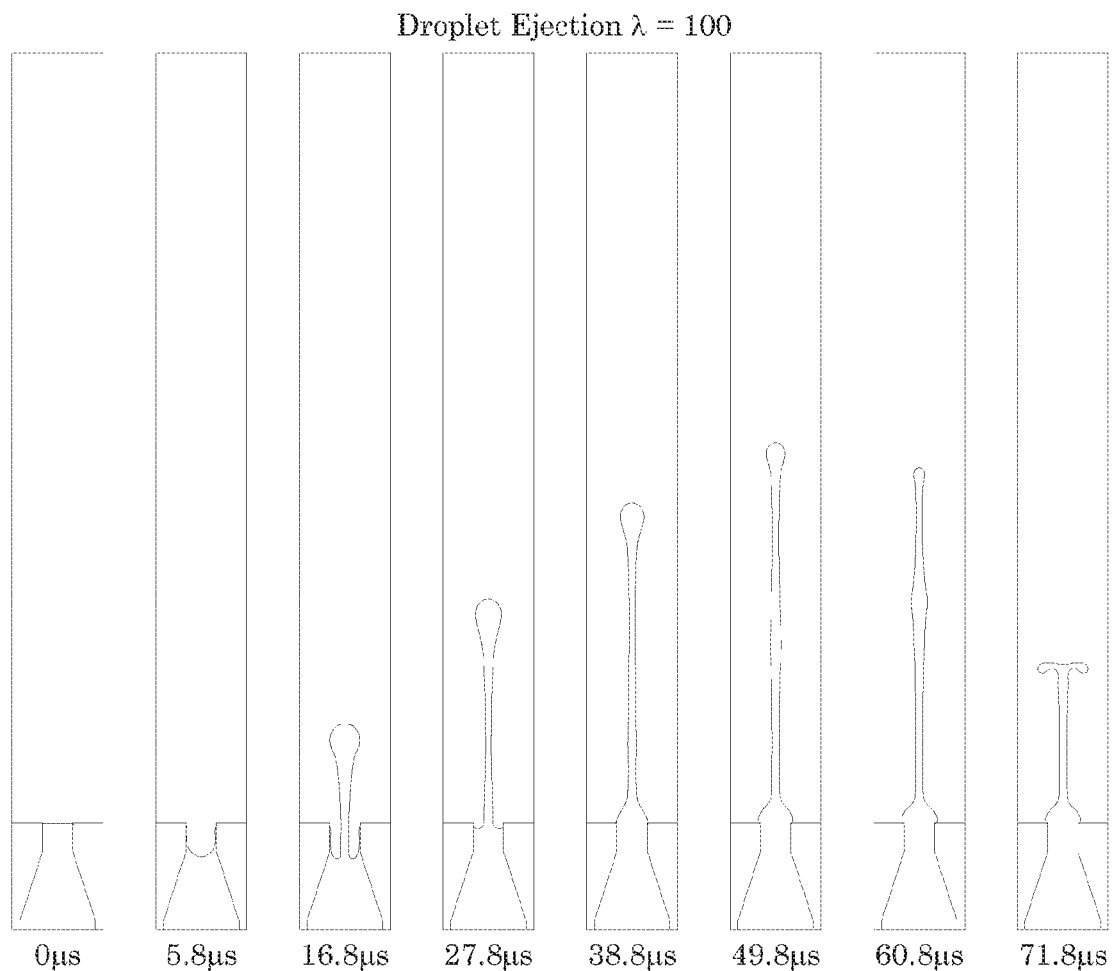
Figure 8:
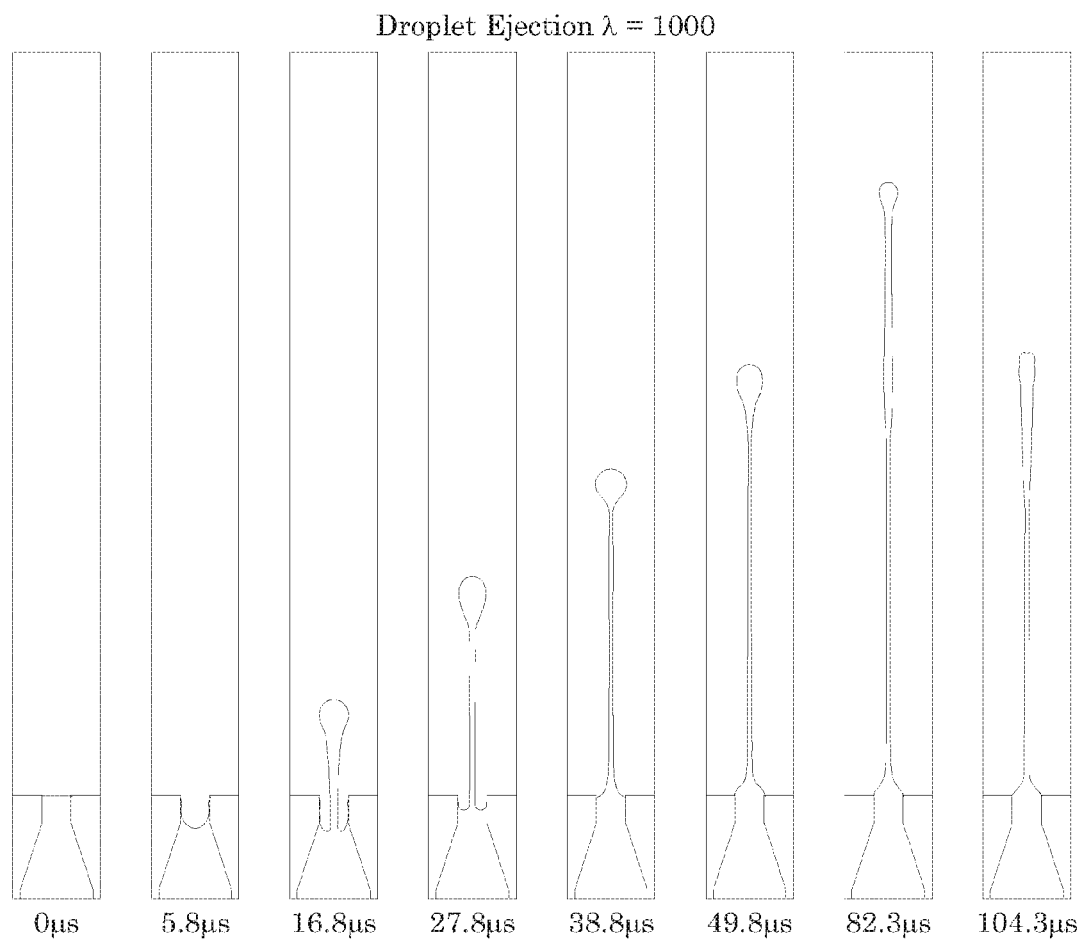

Several numerical experiments have been done using the simulated nozzle described above, in which the normalized relaxation time was varied. FIG. 5 is an illustration of the droplet shapes produced at various time using a second order scheme and a normalized relaxation time of 5. FIG. 6 is an illustration of the droplet shapes produced at various time using a second order scheme and a normalized relaxation time of 20. FIG. 7 is an illustration of the droplet shapes produced at various time using a second order scheme and a normalized relaxation time of 100. FIG. 8 is an illustration of the droplet shapes produced at various time using a second order scheme and a normalized relaxation time of 1000.

Comparing results in FIGS. 5 through 8, we see that, although the normalized relaxation time had little effect on the inflow pressure, it can dramatically influence the droplet speed and shape. Using a typical dynamic input voltage the ink droplet is not ejected when the normalized relaxation time is greater than 1, $\lambda > 1$. In order to eject viscoelastic ink with a large normalized relaxation time, a new ejection method should be used which may include: applying a higher peak voltage; using different dynamic voltage patterns; and/or using a new nozzle geometry. An embodiment of the present invention is useful tool for exploring variations in the ejection method.

FIGS. 5 through 8 provide some information about the behavior of a viscoelastic fluid as the normalized relaxation time $\lambda$ increase such as: the head of the droplet reaches farther from the nozzle; it takes longer for the head of the droplet to reach the farthest extent and to be pulled back towards the nozzle; and the shape of the droplet becomes more slender and longer before it is pulled back to the nozzle. As shown in FIG. 8, when the normalized relaxation time is 1000, $\lambda = 1000$, we see that the head of the ink droplet reaches the farthest point at about 82.3 µs. However, when the normalized relaxation time is 5, $\lambda = 5$, it is at its farthest point around 38.8 µs as shown in FIG. 5. Further analysis shows that when $\lambda = 1000$ it takes 140 µs for the droplet to come back to the nozzle opening and it takes about 60 µs when $\lambda = 5$. These results are consistent with the behavior of viscoelastic fluids. A longer relaxation time means more elastic energy is stored in the fluid, it takes more time to store the energy and it takes longer to release the energy. It is also noteworthy that the long and slender droplet in FIG. 8 does not pinch off. A Newtonian droplet as thin as the one shown in FIG. 8 would pinch off due to capillary instabilities.

Prior art methods have had trouble simulating the flow of a viscoelastic fluid with a long relaxation time. Embodiments of the present invention may take the form of a first order simulation process or a second-order simulation process while giving very similar results. The stability performance of the first-order simulation process and second-order simulation process are not similar.

In order for the stability performance of the various simulation processes to be compared, a metric must first be created which quantifies the stability of a simulation process. For cases in which a droplet pinches off, we consider the simulation process to be stable if the process can simulate the ejection of the entire droplet (including the major droplet and the satellites, if any) which then passes through the end of the solution domain. For cases in which the ink droplet does not pinch off, we deem the simulation process to be stable if the code can simulate the ejection and retraction process until the droplet is pulled back to the nozzle opening.

Table 1 shows the stability performance of the first-order and second-order simulation processes, and the maximum initial time step that may be used to effectively simulate the motion of the viscoelastic fluid. One can see that the second-order algorithm is much more stable than the first-order one. The first-order simulation process is stable when the normalized relaxation time is less than or equal to 300, $\lambda \leq 300$. The second-order simulation process is stable when the normalized relaxation time is less than or equal to 2000, $\lambda \leq 2000$, after which point a smaller initial time step is required. Embodiments of the present invention are capable of simulating viscoelastic fluids when the normalized relaxation time is greater than 2000, $\lambda > 2000$. Inks used in industrial printing applications tend not to have normalized relaxation times greater than 2000.

| Normalized relaxation time | 1st-order | 2nd-order | Max. stable initial $\Delta t(1st/2^{nd})$ |
|---|---|---|---|
| $\lambda = 5$ | Stable | Stable | 0.002/0.002 |
| $\lambda = 10$ | Stable | Stable | 0.002/0.002 |
| $\lambda = 50$ | Stable | Stable | 0.002/0.002 |
| $\lambda = 100$ | Stable | Stable | 0.002/0.002 |
| $\lambda = 300$ | Stable | Stable | 0.002/0.002 |
| $\lambda = 500$ | Unstable | Stable | NA/0.002 |
| $\lambda = 1000$ | Unstable | Stable | NA/0.002 |
| $\lambda = 2000$ | Unstable | Stable | NA/0.001 |

The present invention is a stable simulation process that is capable of simulating a viscoelastic fluid with a large normalized relaxation time. This simulation process may be used to develop a method of effectively ejecting such viscoelastic fluids.

Governing Equations

The following is an implementation of a simulation method including an embodiment of the present invention. A first fluid is a viscoelastic fluid, which may be a dye-based ink. The Oldroyd-b viscoelastic fluid model is used to present the algorithms. Equations (3) in the appendix (along with other numbered equations referenced in the following discussion) are representative of the behavior of the first fluid.

The equation including a time derivate of the stress in equation (4) is a tensor version of equation (2). The second fluid, which may be air and is governed by the incompressible Navier-Stokes equations (5).

In equations (4) and (5), the rate of deformation tensor and the fluid velocity are defined in (6).

The Lagrangian time derivative is $D\vec{u}_i/Dt = [\partial/\partial t + (\vec{u}_i \cdot \nabla)]$ $\vec{u}_i$, $p_i$ is the pressure, $\tau_1$ is the viscoelastic stress tensor of the first fluid, $\rho_i$ is the density, $\mu_i$ is the dynamic viscosity, $\lambda_i$ is the viscoelastic relaxation time, $\mu_{p1}$ is the solute dynamic viscosity of first fluid. The subscript i=1, 2 is used to denote the variable or constant in the viscoelastic first fluid (1) or the Newtonian second fluid (2).

In an embodiment of the present invention, the second fluid is assumed to be Newtonian and the viscoelastic stress tensor $\tau_2$ of the second fluid vanishes. In an embodiment of the present invention, the dynamic viscosity $\mu_1$ is the dynamic viscosity of the solvent used in the first fluid, which is often water. In addition, the first three terms together in the second equation in (4): $D\tau_1/Dt - \tau_1 \cdot (\nabla u_1) - (\nabla u_1)^T \cdot \tau_1$ are collectively referred to as the upper-convected time derivative of the viscoelastic stress tensor. It is used in the Oldroyd-b model to guarantee the material frame indifference. If one replaces the upper-convected time derivative with the material time derivative, the second equation of (3) will look similar to (2) in format. Also, because the size of typical ink-jet print heads is small, the gravity term is not important and is therefore omitted. The inclusion of a gravity term does not change any part of the numerical schemes described in the next sections.

Finally, the numerical schemes described herein work equally well for cases in which both fluids are viscoelastic.

The boundary conditions at the interface of the two phases are the continuity of the velocity and the jump condition set forth in equation (7), where n̂ is the unit normal to the interface between the first fluid and the second fluid, κ is the curvature of the interface, and σ is the surface tension coefficient of the interface.

In an embodiment of the present invention, a level set method may be used to trace the interface between the first fluid and the second fluid. The interface is a zero level Γ of a level set function φ as defined in equation (8).

The level set function φ is defined as the signed distance to the interface Γ. The unit normal n̂ on the interface Γ and the interface curvature κ can be expressed in terms of level set function φ as shown in equations (9).

In order to simplify the presentation of the simulation method, the governing equations for the first fluid and the second fluid are merged, the merged velocity field, viscoelastic stress tensor, pressure field, and rate of deformation tensor is defined as set forth in (10).

The governing equations for the two-phase flow and the boundary condition at the interface can be re-written as (11), (12), and (13), where δ is the Dirac delta function and the density, dynamic viscosity, relaxation time, and solute viscosity are defined in (14). The fact that the surface tension can be written as a body force concentrated at the interface greatly reduces the difficulty solving two-phase fluid flows.

To make the governing equations dimensionless, the definitions in (14) are used, where the primed quantities are dimensionless and L, U, $\rho_1$, $\mu_1$ are respectively the characteristic length, characteristic velocity, density of the first fluid, and solvent dynamic viscosity of the first fluid.

Substituting the definitions in (15) into equations (11), (12), and (13), and dropping the primes, yields the dimensionless governing equations set forth in (16), (17), and (18), in which the density ratio, viscosity ratio, normalized relaxation time, The Reynolds number of the solvent Re, the Weber number We, and the Reynolds number of the solute $Re_p$ are defined by (19).

Since the interface moves with the fluid, the evolution of the level set is governed by the level set convection equation (20). This form is chosen because the interface moves advectively.

Since equations (9), (16), (17), (18), and (20) are expressed in terms of the vector notation, they assume the same form in Cartesian coordinates and axisymmetric coordinates.

First-Order Numerical Algorithm on Rectangular Grids

In this section, the first algorithm, which is first-order accurate in time and second-order accurate in space, is explained. In the following, the superscript n (or n+1) denotes the time step, as illustrated in equation (25). Given quantities $\vec{u}^n$, $p^n$, $\phi^n$, $\tau^n$, the purpose is to obtain $\vec{u}^{n+1}$, $p^{n+1}$, $\phi^{n+1}$, $\tau^{n+1}$, $\tau^{n+1}$ which satisfy the condition of incompressibility (16).

Temporal Discretization

The boundary condition on the nozzle wall stems from the above-mentioned contact model. The inflow pressure at $t^{n+1}$ is given by the equivalent circuit.

Level Set Update

The level set is updated by following (24). The time-centered advection term $[(\vec{u} \cdot \nabla)\phi]^{n+1/2}$ is evaluated using an explicit predictor-corrector scheme that requires only the available data at $t^n$. Once $\phi^{n+1}$ is obtained, $\phi^{n+1/2}$ is computed by using the update rule in (25).

Explicit Time Integration for Momentum Equations

The explicit temporal scheme set forth in (26) is used to discretize the momentum equations. An intermediate variable $\vec{u}^*$ is defined in (27), the time-discretized Navier-Stokes equation is written in terms of $\vec{u}^*$ in (28). A second-order explicit Godunov scheme for the advection term and the central difference for the viscosity term is applied in (27). The determination of $\vec{u}^*$ needs only values at time step $t^n$.

Projection for $\vec{u}^{n+1}$

To satisfy the incompressibility condition for time step $t^{n+1}$, the divergence operator is applied on both sides of (28). Since $\nabla \cdot \vec{u}^{n+1}=0$, the projection equation (29), which is elliptic, is obtained. It reduces to a Poisson equation if the density ratio $\rho(\phi^{n+1/2})$ is a constant. After the pressure $p^{n+1}$ is solved from equation (29), the velocity field $\vec{u}^{n+1}$ can be obtained by (28).

To simplify the implementation for arbitrary geometries, a finite element projection of the form set forth in (30) is used, in which ψ is the finite element weighting function, $\Gamma_1$ denotes all the boundary conditions, and $\vec{u}^{BC}$ is the given inflow or outflow velocity of the fluid. The divergence theorem may be used to show that the implied boundary condition at $\Gamma_1$ is equation (31).

The choice of the weighting function, as well as the approximation for the pressure and velocity, is flexible. In an embodiment of the present invention, the weighting function and the pressure may be located at grid points and may be piecewise bilinear, the velocity may be cell-centered and piecewise constant. The inflow velocity, if prescribed, may be located at the center of each boundary edge.

Semi-Implicit Algorithm for the Viscoelastic Stresses

In the projection step, both a new pressure and a new velocity are obtained. The time-centered velocity at cell centers can be calculated using equation (32). A semi-implicit algorithm may be used to integrate the viscoelastic stress equation in time. A time-discretized, viscoelastic stress equation is shown in equation (33), where $\vec{u}^{n+1/2}$ is the time-centered velocity field at cell centers described in equation (32). Equation (34) is a rearrangement of equation (33).

Advection Terms in the Navier-Stokes and the Level Set Equations

In an embodiment of the present invention the velocity components of $\vec{u}_{i,j}^n$ and the level set function values $\phi_{i,j}^n$ are located at cell centers, and the pressure values $p_{i,j}^n$ are located at grid points. The time-centered edge velocities and level set function values (also called predictors), such as $$\vec{u}_{i+1/2,j}^{n+1/2}, \phi_{i+1/2,j}^{n+1/2},$$

and so on, are located at the middle point of each edge of the grid. Equations (35) and (36) may be used to evaluate the advection terms. In these two equations, the edge velocities and edge level sets may be obtained by using a Taylor expansion in space and time. The time derivatives $\vec{u}_t^n$ and $\phi_t^n$ are substituted by the Navier-Stokes equations and the level set convection equation. The procedure involves extrapolating from both sides of the edge and then applying the Godunov type upwinding to decide which extrapolation to use. The foregoing explains how to obtain $$\vec{u}_{i+1/2,j}^{n+1/2};$$

the other time-centered edge values may be derived in a similar manner.

At the middle point of a vertical edge, the time-centered edge velocity extrapolated from the left is given in (37), where $F_{i,j}^n$ is defined in (38). The edge velocity as extrapolated from the right is given in (39). Note that $$\vec{u}_{i+1/2,j}^{n+1/2,L} \text{ and } \vec{u}_{i+1/2,j}^{n+1/2,R}$$

are used to denote these values.

The monotonicity-limited central difference is used for the evaluation of the normal slopes, which is $\vec{u}_{r,i,j}^n$ in this case. The limiting is done on each component of the velocity at $t^n$ separately. The transverse derivative term is evaluated by first extrapolating $\vec{u}$ to the transverse faces from the cell center, using normal derivatives only, and then applying the Godunov type upwinding.

The next step is the Godunov upwinding. The components of the velocity and the level set values are calculated based on $$\vec{u}_{i+1/2,j}^{n+1/2,L} \text{ and } \vec{u}_{i+1/2,j}^{n+1/2,R}$$

are chosen according to equations (40) and (41).

These intermediate edge velocities are, in general, not divergence-free. An intermediate marker-and-cell (MAC) projection may be used to make all the normal edge velocities divergence free. An intermediate function q is a function, which is relatively smooth. The velocity $\vec{u}^e$ is representative of the edge velocities as calculated in equations (40) and (41). In an embodiment of the present invention equation (42) is divergence free. Taking the divergence of equation (42) gives us equation (43). Discretizing and solving equation (43) it is possible to obtain q and make the intermediate edge velocities $\vec{u}^e$ divergence free. The function q is used to make the intermediate edge velocity divergence free.

In an embodiment of the present invention q is cell centered. Multiplying equation (43) by r for axi-symmetric coordinates and omitting the superscript n for simplicity, yields equation (44). Hence, the discretized MAC projection equation in (45) is obtained.

The boundary condition for the intermediate function q should be compatible with the physical boundary conditions. On the solid walls, the no flow condition $\vec{u} \cdot \hat{n} = 0$ is consistent with the intermediate edge velocity $\vec{u}^e$; which implies that there is a homogeneous Neumann boundary condition on q, namely $\partial q/\partial \hat{n}=0$. At the inflow or outflow, if a velocity is prescribed, it is again a homogeneous Neumann boundary condition on q, since the given velocity at $t^{n+1}$ has been included in obtaining $\vec{u}^e$. If a pressure is given, the corresponding condition on q is as set forth in (46), where the factor 2 in the denominator appears because the edge velocity is time-centered.

Evaluation of the Normal Derivatives

In an embodiment of the present invention, the normal derivatives in equations (37) and (39) can be evaluated using a monotonicity limited central difference scheme. In an embodiment of the present invention a fourth order monotonicity limited central difference scheme may be used to calculate the normal derivatives. The following scheme may be used to calculate $\vec{u}_{r,i,j}^n$ on a uniform rectangular grid. The scheme may be written in terms of several difference operator definitions defined in (48). The difference operators are used to define a limiting slope in (49). The limiting slope is used to define a second order limited slope in (50). The second order limited slope is used to define a fourth order limited slope in (51). The fourth order monotonicity limited normal derivative is defined in (52).

Evaluation of the Tangential Derivatives

In an embodiment of the present invention the tangential derivative are computed using an upwind scheme, such as the one described in equation (53). In equation (53), $$\hat{u}_{i,j+1/2} \text{ and } \hat{v}_{i,j+1/2}^{adv}$$

are calculated using a Taylor's extrapolation, from the top and bottom of the edge. Equation (54) is an example of how these derivatives may be calculated, neglecting the pressure, viscosity, and surface tension terms. The derivatives at the right hand side are again computed using the monotonicity-limited central difference scheme described above. As described in equations (55) and (56) an upwind evaluation may be used to obtain $$\hat{u}_{i,j+1/2} \text{ and } \hat{v}_{i,j+1/2}^{adv}.$$

Spatial Discretization of the Viscoelastic Stress Equations

Time-discretized equation (34) needs to be discretized in space and time. The first term in the square bracket is a convection term. The simple first-order upwind algorithm set forth in equation (57) may be used to evaluate the term on uniform rectangular grids. The second and third terms in the square bracket of equation (34) and the viscosity term may be discretized using a central difference scheme.

Constraint on Time Step

Since the time integration scheme is 2nd-order explicit for the convection term and 1st-order explicit for viscosity, the constraint on time step $\Delta t$ is determined by the CFL condition, surface tension, viscosity, and total acceleration, as in (61). The time step calculated in equation (61) is a good indicator of stability. If the time step becomes less than a stability threshold than the system is considered to be unstable. The stability threshold may be relative to the length of the simulation. The stability threshold may also be related to a multiple of the minimum accuracy of the number type used in the calculations. Alternatively, the stability may be calculated over a number of time steps in which a small time step is allowed over a short period of time relative to the whole simulation time.

In a simulation process using an adaptive time step method, the simulation process is identified as unstable when the time step approaches the accuracy of the simulation process. For example if the simulation process uses a second order approximation and the mesh size is $\Delta x$, than the simulation is considered to be stable as long as $\Delta t > \Delta x^n$, wherein n is the order of the simulation. The simulation process is approaching instability as $\Delta t$ approaches $\Delta x^2$. One practice for insuring stability is ensuring that $\Delta t \leq 20 \Delta x^2$. For example if mesh size is 0.01 than the time step should never be less than 0.002. The safety factor of 20 may be used to ensure a safety margin in the simulation method. Although 20 is the safety factor used in this example other safety factors are used in practice such as 2, 5, and 10, or a safety factor between 2 and 50. The reasoning behind this is that the capacity of the simulation process is limited by the mesh size and the order of the approximations used by the simulation process, as your normalized step size approaches these limits errors start to accumulate at an unrecoverable pace. An individual skilled in the art will appreciate how to adapt this stability criterion to an adaptive mesh and or a fixed time step.

Second-Order Numerical Algorithm on Rectangular Grids

The discussion now turns to the second algorithm for two-phase viscoelastic fluid flows. The algorithm is semi-implicit in time and it is second-order accurate in both space and time. Given quantities $\vec{u}^n$, $p^{n-1/2}$, $\phi^n$, $\tau^n$ the purpose is to obtain $\vec{u}^{n+1}$, $p^{n+1/2}$, $\phi^{n+1}$, $\tau^{n+1}$ which satisfy the condition of incompressibility (16). In an embodiment of the present invention the pressure lags by one half time step, this helps to insure the scheme is second-order accurate in time.

Temporal Discretization

The boundary condition on the nozzle wall stems from the above-mentioned contact model. The inflow pressure at $t^{n+1}$ is given by the equivalent circuit.

Level Set Update

In an embodiment of the present invention level set values may be updated using equation (24). The time-centered advection term is evaluated using an explicit predictor-corrector scheme that requires only the data available at $t^n$. Once $\phi^{n+1}$ is obtained, $\phi^{n+1/2}$ may be computed by using equation (25). The level set update for this second-order accurate in time algorithm is the same as that of the first-order in time algorithm presented in the previous section.

Semi-Implicit Time Integration for Momentum Equations

In an embodiment of the present invention a semi-implicit temporal scheme may be used to satisfy the momentum equations and continuity equation in a manner set up in equations (62) and (63). The momentum equations may be integrated as follows. An intermediate velocity $\vec{u}^{**}$ is defined in an equation (64), then a viscosity term may be inverted to obtain a non-divergence-free velocity predictor $\vec{u}^*$ by solving equations (65) and (66). This step insures the viscosity term is semi-implicit and increases code stability. Before doing the projection, the pressure contribution is deducted from the velocity predictor, as set forth in equation (67). This step is to make sure that the whole velocity field is projected to obtain the whole pressure. Finally solve the projection equation (68) by enforcing the incompressibility condition at $t^{n+1}$.

In equation (64), a second-order explicit Godunov method is applied for the advection term, and the central difference for the viscosity term and surface tension term. It is noted that the viscoelastic stress term is evaluated at $t^{n+1/2}$. The time-centered cell edge viscoelastic stresses are first obtained by Taylor's expansion and Godunov upwinding. The central difference is then employed to evaluate the divergence.

Projection for $\vec{u}^{n+1}$

To satisfy the incompressibility condition for time step $t^{n+1}$, the divergence operator is applied on both sides of equation (68). Since $\nabla \cdot \vec{u}^{n+1} = 0$, equation (68) results. After the pressure $p^{n+1/2}$ is solved from equation (69), the velocity field $\vec{u}^{n+1}$ can be obtained by using equation (68).

To simplify the implementation for arbitrary geometries, the finite element projection in equation (30) is used. The projection step for the second-order algorithm is the same as that of the first-order algorithm, except that the second-order algorithm has $p^{n+1/2}$ instead of $p^{n+1}$.

Mixed Algorithm for the Viscoelastic Stresses

An algorithm, which is explicit on the advection term, semi-implicit on the viscosity term, and implicit on the relaxation term is used to integrate the viscoelastic stress over time. The viscoelastic stress equation is discretized as set forth in equation (70), where $\vec{u}^{n+1/2}$ and $\tau^{n+1/2}$ are the time-centered cell edge velocity and viscoelastic stress tensor may be calculated using a Taylor's expansion and Godunov upwinding. After arrangement, equation (70) can be rewritten as equation (71).

Re-Initialization of the Level Set

To correctly capture the interface and accurately calculate the surface tension, the level set function should remain a signed distance function to the interface as the calculations unfold. However, if the level set is updated by (24), it will not remain as such. Instead, the simulation is periodically stopped and a new level set function $\phi$ recreated, which is the signed distance function, i.e. $|\nabla|=1$, without changing the zero level set of the original level set function. A re-initialization algorithm for performing re-initialization in the present invention can be found in related application Ser. No. 10/729,637, filed on Dec. 5, 2003, and entitled "Selectively Reduced Bi-cubic Interpolation for Ink-Jet Simulations on Quadrilateral Grids," the content of which is incorporated by reference herein. Other known and suitable re-initialization techniques may also be used.

Advection Terms in Navier-Stokes and Level Set Equations

The handling of the advection terms in the Navier-Stokes equations and level set equation is exactly the same as the first algorithm

Spatial Discretization of Viscoelastic Stress Equations

In an embodiment of the present invention the viscoelastic stress tensor $\tau_{i,j}{}^n$ is co-located with velocity at cell centers. The time-centered stress tensor (i.e., the stress predictor), $$\tau_{i+1/2,j}^{n+1/2},$$

is located at the middle point of each cell edge. Equation (72) may be employed to evaluate the advection term in equation (71). The time-centered edge stress tensor may be obtained by doing a Taylor expansion of $\tau$ in both space and time. The time derivative $\tau_t{}^n$ may be substituted with the viscoelastic stress equation. The procedure involves extrapolating from both sides of the edge and then applying the Godunov type upwinding to decide which extrapolation to use. The following explains in detail how to obtain $$\tau_{i+1/2,j}^{n+1/2};$$

the other time-centered edge values may be obtained in a similar manner.

At the middle point of a vertical edge, the time-centered edge viscoelastic stress tensor extrapolated from the left is given by equation (73), where $G_{i,j}{}^n$ is defined in equation (74). The edge stress tensor extrapolated from the right is given by equation (75). Note that $$\tau_{i+1/2,j}^{n+1/2,L}, \text{ and } \tau_{i+1/2,j}^{n+1/2,R},$$

are used to denote these two different values.

In an embodiment of the present invention, a monotonicity limited central difference scheme may be used for the evaluation of the normal slopes, which are $$\tau_{r,i,j}^n \text{ and } \tau_{r,i+1,j}^n$$

in this case. The limiting may be done on each component of the viscoelastic stress separately at each time $t^n$. The transverse derivative term may be evaluated by first extrapolating $\tau$ to the transverse faces from the cell center, using normal derivatives only, and then applying Godunov type upwinding scheme to calculate the transverse derivative terms.

In the Godunov upwinding scheme one of $$\tau_{i+1/2,j}^{n+1/2,L}, \text{ and } \tau_{i+1/2,j}^{n+1/2,R}$$

is chosen to be the time-centered edge value according to the rules described in (76). The time-centered edge stresses may than be used in equation (72) for the calculation of the convection term in equation (71).

Evaluation of the Upper Convected Derivative Term

The second and third terms of the upper-convected derivative may be evaluated using expansion of the time centered cell edge velocities and the viscoelastic stress tensor. Since these two terms are similar, the expansion is described for only one term here. An individual skilled in the art will appreciate how to expand the third term in the same manner as the second term. In axi-symmetric coordinate systems, the first term of the upper-convected derivative can be expanded and expressed in a dyadic form such as the one set forth in equation (77). The value of the upper-convected terms may be evaluated at cell centers by making use of central differences and time-centered cell edge stresses. Omitting the superscript $n+\frac{1}{2}$ for simplicity sakes gives us the discretized terms as set forth in (78).

The Divergence of Viscoelastic Stresses

The divergence of the viscoelastic stresses in equation (64) may be evaluated using the time-centered edge stresses. To illustrate this, the divergence is first expanded as in equation (79). The divergence may be evaluated at the cell centers by use of the time-centered cell edge values and a central difference scheme. The discretized terms of equation (79) are given in (80).

Interface Thickness and Time Step Constraint

Because of the numerical difficulty caused by the Dirac delta function and by the sharp change of $\rho$, $\nu$, and $\lambda$ across the free surface, the Heaviside and Dirac delta functions are replaced by smoothed functions as described by equations (58)-(60).

Since the time integration scheme is 2nd-order explicit in time, the constraint on time step $\Delta t$ is determined by the CFL condition, surface tension, viscosity, and total acceleration, as in equation (61).

System

Figure 9:
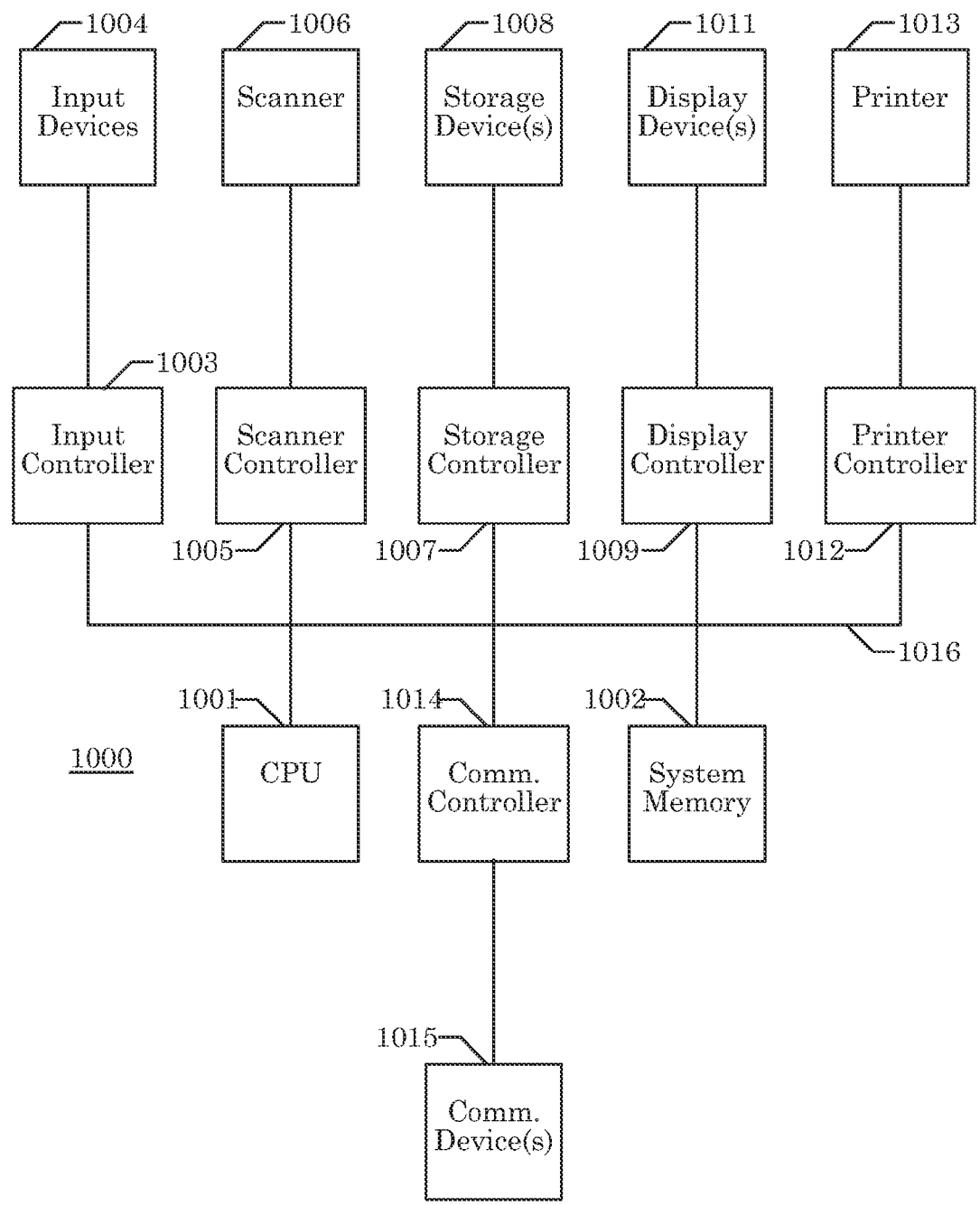
FIG. 9 is an illustration of a system for performing the method.

Having described the details of the invention, an exemplary system 1000, which may be used to implement one or more aspects of the present invention will now be described with reference to FIG. 9. As illustrated in FIG. 9, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 9. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

APPENDIX $$\rho_1 \frac{D\bar{u}_1}{Dt} = -\nabla p_1 + \nabla \cdot (2\mu_1 D_1) + \nabla \cdot \tau_1, \quad \nabla \cdot \bar{u}_1 = 0, \tag{4}$$

$$\frac{D\tau_1}{Dt} = \tau_1 \cdot (\nabla \bar{u}_1) + (\nabla \bar{u}_1)^T \cdot \tau_1 - \frac{1}{\lambda_1}(\tau_1 - 2\mu_{p1} D_1)$$

$$\rho_2 \frac{D\bar{u}_2}{Dt} = -\nabla p_2 + \nabla \cdot (2\mu_2 D_2), \quad \nabla \cdot \bar{u}_2 = 0 \tag{5}$$

$$D_i = \frac{1}{2}[\nabla \bar{u}_i + (\nabla \bar{u}_i)^T], \quad i = 1, 2 \tag{6}$$

$$\bar{u}_i = u_i \hat{e}_r + v_i \hat{e}_z, \quad i = 1, 2$$

APPENDIX-continued $$s = \frac{\mu_{p1}}{\lambda_1}[\nabla \bar{u}_i + (\nabla \bar{u}_i)^T]$$

$$(2\mu_1 D_1 - 2\mu_2 D_2) \cdot \hat{n} = (p_1 - p_2 + \sigma \kappa)\hat{n} \tag{7}$$

$$\varphi(r, z, t) \begin{cases} < 0 \text{ if } (r, z) \in \text{The first fluid} \\ = 0 \text{ if } (r, z) \in \text{The interface} \\ > 0 \text{ if } (r, z) \in \text{The second fluid} \end{cases} \tag{8}$$

$$\hat{n} = \frac{\nabla \phi}{|\nabla \phi|}\bigg|_{\phi=0} \tag{9}$$

$$\kappa = \nabla \cdot \left(\frac{\nabla \phi}{|\nabla \phi|}\right)\bigg|_{\phi=0}$$

$$\bar{u} = \begin{cases} \bar{u}_1, \phi > 0 \\ \bar{u}_2, \phi < 0, \end{cases} \tau = \begin{cases} \tau_1, \phi > 0 \\ 0, \phi < 0, \end{cases} p = \begin{cases} p_1, \phi > 0 \\ p_2, \phi < 0, \end{cases} D = \begin{cases} D_1, \phi > 0 \\ D_2, \phi < 0 \end{cases} \tag{10}$$

$$\nabla \cdot \bar{u} = 0 \tag{11}$$

$$\rho(\phi)\frac{D\bar{u}}{Dt} = -\nabla p + \nabla \cdot (2\mu(\phi)D) + \nabla \cdot \tau - \sigma \kappa(\phi)\delta(\phi)\nabla \phi \tag{12}$$

$$\frac{D\tau}{Dt} = \tau \cdot (\nabla \bar{u}) + (\nabla \bar{u})^T \cdot \tau - \frac{1}{\lambda(\phi)}(\tau - 2\mu_p(\phi)D) \tag{13}$$

$$s = \frac{2\mu_p}{\lambda(\phi)}D = \frac{\mu_p}{\lambda(\phi)}[\nabla \bar{u} + (\nabla \bar{u})^T]$$

$$\rho(\phi) = \begin{cases} \rho_1 & \text{if } \phi \geq 0 \\ \rho_2 & \text{if } \phi < 0, \end{cases} \mu(\phi) = \begin{cases} \mu_1 & \text{if } \phi \geq 0 \\ \mu_2 & \text{if } \phi < 0, \end{cases} \tag{14}$$

$$\lambda(\phi) = \begin{cases} \lambda_1 & \text{if } \phi \geq 0 \\ 0 & \text{if } \phi < 0, \end{cases} \mu_p(\phi) = \begin{cases} \mu_{p1} & \text{if } \phi \geq 0 \\ 0 & \text{if } \phi < 0. \end{cases}$$

$$x = Lx', \quad y = Ly', \quad t = \frac{L}{U}t', \tag{15}$$

$$p = \rho_1 U^2 p', \quad \bar{u} = U\bar{u}', \quad \tau = \rho_1 U^2 \tau',$$

$$\rho = \rho_1 \rho', \quad \mu = \mu_1 \mu', \quad \lambda = \frac{L}{U}\lambda', \quad \mu_P = \mu_1 \mu'_P,$$

$$\nabla \cdot \bar{u} = 0 \tag{16}$$

$$\frac{D\bar{u}}{Dt} = -\frac{1}{\rho(\phi)}\nabla p + \frac{1}{\rho(\phi)\text{Re}}\nabla \cdot (2\mu(\phi)D) - \frac{1}{\rho(\phi)\text{We}}\kappa(\phi)\delta(\phi)\nabla \phi + \nabla \cdot \tau \tag{17}$$

$$\frac{D\tau}{Dt} = \tau \cdot (\nabla \bar{u}) + (\nabla \bar{u})^T \cdot \tau - \frac{1}{\lambda(\phi)}\left(\tau - 2\frac{\mu_p(\phi)}{\text{Re}_p}D\right) \tag{18}$$

$$\rho(\phi) = \begin{cases} 1 & \text{if } \phi \geq 0 \\ \rho_2/\rho_1 & \text{if } \phi < 0 \end{cases} \tag{19}$$

$$\mu(\phi) = \begin{cases} 1 & \text{if } \phi \geq 0 \\ \mu_2/\mu_1 & \text{if } \phi < 0 \end{cases}$$

$$\lambda(\phi) = \begin{cases} 1 & \text{if } \phi \geq 0 \\ 0 & \text{if } \phi < 0 \end{cases}$$

$$\text{Re} = \frac{\rho_1 UL}{\mu_1}$$

$$\text{We} = \frac{\rho_1 U^2 L}{\sigma}$$

APPENDIX-continued $$\text{Re}_p = \frac{\rho_1 U L}{\mu_{p1}}$$

$$\frac{\partial \phi}{\partial t} + \vec{u} \cdot \nabla \phi = 0 \tag{20}$$

$$\vec{u} = \vec{u}^{BC} \tag{21}$$

$$p = p^{BC}, \quad \frac{\partial \vec{u}}{\partial \hat{n}} = 0 \tag{22}$$

$$\vec{u}^n = \vec{u}(t = n\Delta t) \tag{23}$$

$$\phi^{n+1} = \phi^n - \Delta t [\vec{u} \cdot \nabla \phi]^{n+1/2} \tag{24}$$

$$\phi^{n+1/2} = \frac{1}{2}(\phi^n + \phi^{n+1}) \tag{25}$$

$$\frac{\vec{u}^{n+1} - \vec{u}^n}{\Delta t} + [(\vec{u} \cdot \nabla)\vec{u}]^{n+1/2} = \tag{26}$$
$$-\frac{1}{\rho(\phi^{n+1/2})} \nabla p^{n+1} + \frac{1}{\rho(\phi^{n+1/2})\text{Re}} \nabla \cdot [2\mu(\phi^{n+1/2})D^n] +$$
$$\nabla \cdot \tau^n - \frac{1}{\rho(\phi^{n+1/2})\text{We}} [\kappa(\phi)\delta(\phi)\nabla \phi]^{n+1/2}$$

$$\vec{u}^* = \vec{u}^n + \Delta t \left\{ -[(\vec{u} \cdot \nabla)\vec{u}]^{n+1/2} + \frac{1}{\rho(\phi^{n+1/2})\text{Re}} \nabla \cdot [2\mu(\phi^{n+1/2})D^n] \right. \tag{27}$$
$$\left. \nabla \cdot \tau^n - \frac{1}{\rho(\phi^{n+1/2})\text{We}} [\kappa(\phi)\delta(\phi)\nabla \phi]^{n+1/2} \right\}$$

$$\vec{u}^{n+1} = \vec{u}^* - \frac{\Delta t}{\rho(\phi^{n+1/2})} \nabla p^{n+1} \tag{28}$$

$$\nabla \cdot \vec{u}^* = \nabla \cdot \left( \frac{\Delta t}{\rho(\phi^{n+1/2})} \nabla p^{n+1} \right) \tag{29}$$

$$\int_\Omega \vec{u}^* \cdot \nabla \psi \, d\mathbf{x} = \int_\Omega \frac{\Delta t}{\rho(\phi^{n+1/2})} \nabla p^{n+1} \cdot \nabla \psi \, d\mathbf{x} + \int_{\Gamma_1} \psi \vec{u}^{BC} \cdot \hat{n} \, dS \tag{30}$$

$$\frac{\Delta t}{\rho(\phi^{n+1/2})} \frac{\partial p^{n+1}}{\partial \hat{n}} = (\vec{u}^* - \vec{u}^{BC}) \cdot \hat{n} \tag{31}$$

$$\vec{u}^{n+1} = (\vec{u}^n + \vec{u}^{n+1})/2 \tag{32}$$

$$\frac{\tau^{n+1} - \tau^n}{\Delta t} = -(\vec{u}^{n+1/2} \cdot \nabla)\tau^n + \tau^n \cdot (\nabla \vec{u}^{n+1/2}) + (\nabla \vec{u}^{n+1/2})^T \cdot \tau^n - \tag{33}$$
$$\frac{1}{\lambda(\phi^{n+1/2})} \left( \tau^{n+1} - 2\frac{\mu_p(\phi^{n+1/2})}{\text{Re}_p} D^{n+1/2} \right)$$

$$\left(1 + \frac{\Delta t}{\lambda_p(\phi^{n+1/2})}\right)\tau^{n+1} = \tau^n + \Delta t \left[ -(\vec{u}^{n+1/2} \cdot \nabla)\tau^n + \tau^n \cdot (\nabla \vec{u}^{n+1/2}) + \tag{34} \right.$$
$$\left. (\nabla \vec{u}^{n+1/2})^T \cdot \tau^n \right] + \frac{2\Delta t \mu_p(\phi^{n+1/2})}{\lambda(\phi^{n+1/2})\text{Re}_p} D^{n+1/2}$$

$$[(\vec{u} \cdot \nabla)\vec{u}]_{i,j}^{n+1/2} = \frac{u_{i+1/2,j}^{n+1/2} + u_{i-1/2,j}^{n+1/2}}{2} \frac{u_{i+1/2,j}^{n+1/2} - u_{i-1/2,j}^{n+1/2}}{\Delta r} + \tag{35}$$
$$\frac{v_{i,j+1/2}^{n+1/2} + v_{i,j-1/2}^{n+1/2}}{2} \frac{u_{i,j+1/2}^{n+1/2} - u_{i,j-1/2}^{n+1/2}}{\Delta z}$$

$$[(\vec{u} \cdot \nabla)\phi]_{i,j}^{n+1/2} = \frac{u_{i+1/2,j}^{n+1/2} + u_{i-1/2,j}^{n+1/2}}{2} \frac{\phi_{i+1/2,j}^{n+1/2} - \phi_{i-1/2,j}^{n+1/2}}{\Delta r} + \tag{36}$$
$$\frac{v_{i,j+1/2}^{n+1/2} + v_{i,j-1/2}^{n+1/2}}{2} \frac{\phi_{i,j+1/2}^{n+1/2} - \phi_{i,j-1/2}^{n+1/2}}{\Delta z}$$

$$\vec{u}_{i+1/2,j}^{n+1/2,L} = \vec{u}_{i,j}^n + \frac{\Delta r}{2} \vec{u}_{r,i,j}^n + \frac{\Delta t}{2} \vec{u}_{t,i,j}^n \tag{37}$$
$$= \vec{u}_{i,j}^n + \frac{1}{2}(\Delta r - \Delta t \vec{u}_{i,j}^n) \vec{u}_{r,i,j}^n - \frac{\Delta t}{2}(\vec{v}\vec{u}_z)_{i,j} + \frac{\Delta t}{2} F_{i,j}^n$$

$$F_{i,j}^n = \tag{38}$$
$$\left[ -\frac{1}{\rho(\phi)} \nabla p + \frac{1}{\rho(\phi)\text{Re}} \nabla \cdot (2\mu(\phi)D) + \nabla \cdot \tau - \frac{1}{\rho(\phi)\text{We}} \kappa(\phi)\delta(\phi)\nabla \phi \right]_{i,j}^n$$

$$\vec{u}_{i+1/2,j}^{n+1/2,R} = \vec{u}_{i+1,j}^n - \frac{\Delta r}{2} \vec{u}_{r,i+1,j}^n + \frac{\Delta t}{2} \vec{u}_{t,i+1,j}^n \tag{39}$$
$$= \vec{u}_{i+1,j}^n - \frac{1}{2}(\Delta r + \Delta t \vec{u}_{i+1,j}^n) \vec{u}_{r,i+1,j}^n - \frac{\Delta t}{2}(\vec{v}\vec{u}_z)_{i+1,j} + \frac{\Delta t}{2} F_{i+1,j}^n$$

$$u_{i+1/2,j}^{n+1/2} = \begin{cases} u_{i+1/2,j}^{n+1/2,L} & \text{if } u_{i+1/2,j}^{n+1/2,L} > 0 \text{ and } u_{i+1/2,j}^{n+1/2,L} + u_{i+1/2,j}^{n+1/2,R} > 0 \\ u_{i+1/2,j}^{n+1/2,R} & \text{if } u_{i+1/2,j}^{n+1/2,R} < 0 \text{ and } u_{i+1/2,j}^{n+1/2,L} + u_{i+1/2,j}^{n+1/2,R} < 0 \\ 0 & \text{otherwise} \end{cases} \tag{40}$$

$$u_{i+1/2,j}^{n+1/2} = \begin{cases} v_{i+1/2,j}^{n+1/2,L} & \text{if } u_{i+1/2,j}^{n+1/2} > 0 \\ v_{i+1/2,j}^{n+1/2,R} & \text{if } u_{i+1/2,j}^{n+1/2} < 0 \\ \frac{v_{i+1/2,j}^{n+1/2,L} + v_{i+1/2,j}^{n+1/2,R}}{2} & \text{if } u_{i+1/2,j}^{n+1/2} = 0 \end{cases} \tag{41}$$

$$\phi_{i+1/2,j}^{n+1/2} = \begin{cases} \phi_{i+1/2,j}^{n+1/2,L} & \text{if } u_{i+1/2,j}^{n+1/2} > 0 \\ \phi_{i+1/2,j}^{n+1/2,R} & \text{if } u_{i+1/2,j}^{n+1/2} < 0 \\ \frac{\phi_{i+1/2,j}^{n+1/2,L} + \phi_{i+1/2,j}^{n+1/2,R}}{2} & \text{if } u_{i+1/2,j}^{n+1/2} = 0 \end{cases}$$

$$\vec{u}^e - \frac{1}{\rho(\phi^n)} \nabla q \tag{42}$$

$$\nabla \cdot \left( \frac{1}{\rho(\phi^n)} \nabla q \right) = \nabla \cdot \vec{u}^e \tag{43}$$

$$\frac{\partial}{\partial r}\left( \frac{r}{\rho(\phi)} \frac{\partial q}{\partial r} \right) + \frac{\partial}{\partial z}\left( \frac{r}{\rho(\phi)} \frac{\partial q}{\partial r} \right) = \frac{\partial}{\partial r}(ru^e) + \frac{\partial}{\partial r}(rv^e) \tag{44}$$

$$\frac{1}{\Delta r^2}\left[ \frac{r_{i+1/2,j}}{(\rho(\phi))_{i+1/2,j}}(q_{i+1,j} - q_{i,j}) - \frac{r_{i-1/2,j}}{(\rho(\phi))_{i-1/2,j}}(q_{i,j} - q_{i-1,j}) \right] + \tag{45}$$
$$\frac{r_{i,j}}{\Delta z^2}\left[ \frac{1}{(\rho(\phi))_{i,j+1/2}}(q_{i,j+1} - q_{i,j}) - \frac{1}{(\rho(\phi))_{i,j-1/2}}(q_{i,j} - q_{i,j-1}) \right] =$$
$$\frac{r_{i+1/2,j} u_{i+1/2,j}^{n+1/2} - r_{i-1/2,j} u_{i-1/2,j}^{n+1/2}}{\Delta r} + \frac{r_{i,j}(v_{i,j+1/2}^{n+1/2} - v_{i,j-1/2}^{n+1/2})}{\Delta z}$$

$$q = \frac{\Delta t}{2} \Delta p^{boundary} \tag{46}$$

$$u_{i+1/2,j}^{n+1/2} \leftarrow u_{i+1/2,j}^{n+1/2} - \frac{1}{(\rho(\phi))_{i+1/2,j}} \frac{q_{i+1,j} - q_{i,j}}{\Delta r} \tag{47}$$

$$v_{i,j+1/2}^{n+1/2} \leftarrow v_{i,j+1/2}^{n+1/2} - \frac{1}{(\rho(\phi))_{i,j+1/2}} \frac{q_{i,j+1} - q_{i,j}}{\Delta z}$$

$$D_{r,i,j}^c = (\vec{u}_{i+1,j} - \vec{u}_{i-1,j})/2 \tag{48}$$
$$D_{r,i,j}^+ = \vec{u}_{i+1,j} - \vec{u}_{i,j}$$
$$D_{r,i,j}^c = \vec{u}_{i,j} - \vec{u}_{i-1,j}$$

APPENDIX-continued $$\delta_{lim,i,j} = \begin{cases} \min(2|D^-_{r,i,j}|, 2|D^+_{r,i,j}|) & \text{if } D^-_{r,i,j} \times D^+_{r,i,j} > 0 \\ 0 & \text{otherwise} \end{cases} \quad (49)$$

$$\delta_{f,i,j} = \min(|D^c_{r,i,j}|, \delta_{lim,i,j}) \times \text{sign}(D^c_{r,i,j}) \quad (50)$$

$$\delta^4_{r,i,j} = \min\left(\left|\frac{4D^c_{r,i,j}}{3} - \frac{\delta_{f,i,j} + \delta_{f,i,j}}{6}\right|, \delta_{lim,i,j}\right) \times \text{sign}(D^c_{r,i,j}) \quad (51)$$

$$u_{r,i,j} = \delta^4_{r,i,j}/\Delta r \quad (52)$$

$$\left(\overset{\square}{v}\overline{u}_z\right)_{i,j} = \frac{\hat{v}^{adv}_{i,j+1/2} + \hat{v}^{adv}_{i,j-1/2}}{2} \frac{\hat{u}_{i,j+1/2} - \hat{u}_{i,j-1/2}}{\Delta z} \quad (53)$$

$$\hat{u}^B_{i,j+1/2} = \overline{u}^n_{i,j} + \frac{1}{2}(\Delta z - \Delta t v^n_{i,j})\overline{u}^n_{z,i,j} \quad (54)$$

$$\hat{u}^T_{i,j+1/2} = \overline{u}^n_{i,j+1} - \frac{1}{2}(\Delta z + \Delta t v^n_{i,j+1})\overline{u}^n_{z,i,j+1}$$

$$\hat{v}^{adv}_{i,j+1/2} = \begin{cases} \hat{v}^B_{i,j+1/2} & \text{if } \hat{v}^B_{i,j+1/2} > 0 \text{ and } \hat{v}^B_{i,j+1/2} + \hat{v}^T_{i,j+1/2} > 0 \\ \hat{v}^T_{i,j+1/2} & \text{if } \hat{v}^T_{i,j+1/2} < 0 \text{ and } \hat{v}^B_{i,j+1/2} + \hat{v}^T_{i,j+1/2} < 0 \\ 0 & \text{otherwise} \end{cases} \quad (55)$$

$$\hat{u}_{i,j+1/2} = \begin{cases} \hat{u}^B_{i,j+1/2} & \text{if } \hat{v}^{adv}_{i,j+1/2} > 0 \\ \hat{u}^T_{i,j+1/2} & \text{if } \hat{v}^{adv}_{i,j+1/2} < 0 \\ \frac{\hat{u}^B_{i,j+1/2} + \hat{u}^T_{i,j+1/2}}{2} & \text{if } \hat{v}^{adv}_{i,j+1/2} = 0 \end{cases} \quad (56)$$

$$(\overline{u}^{n+1/2} \cdot \nabla)\tau^n = \max(u^{n+1/2}_{i,j}, 0)\frac{\tau^n_{i,j} - \tau^n_{i-1,j}}{\Delta x} + \min(u^{n+1/2}_{i,j}, 0)\frac{\tau^n_{i+1,j} - \tau^n_{i,j}}{\Delta x} + \max(v^{n+1/2}_{i,j}, 0)\frac{\tau^n_{i,j} - \tau^n_{i,j-1}}{\Delta y} + \min(v^{n+1/2}_{i,j}, 0)\frac{\tau^n_{i,j+1} - \tau^n_{i,j}}{\Delta y} \quad (57)$$

$$H(\phi) = \begin{cases} 0 & \text{if } \phi < -\varepsilon \\ \frac{1}{2}\left[1 + \frac{\phi}{\varepsilon} + \frac{1}{\pi}\sin\left(\frac{\pi\phi}{\varepsilon}\right)\right] & \text{if } |\phi| \leq \varepsilon \\ 1 & \text{if } \phi > \varepsilon. \end{cases} \quad (58)$$

$$\delta(\phi) = \frac{dH(\phi)}{d\phi} \quad (59)$$

$$\varepsilon = \frac{\alpha}{2}(\Delta r + \Delta z) \quad (60)$$

$$\Delta t < \min_{i,j}\left[\frac{\Delta r}{|u| + \sqrt{2(\tau_{rr} + 1/\lambda \text{Re})}}, \frac{\Delta z}{|v| + \sqrt{2(\tau_{zz} + 1/\lambda \text{Re})}}, \sqrt{\text{We}\frac{\rho_1 + \rho_2}{8\pi}}h^{3/2}, \frac{\text{Re}}{2}\frac{\rho^n}{\mu^n}\left(\frac{1}{\Delta r^2} + \frac{1}{\Delta z^2}\right)^{-1}, \sqrt{\frac{2h}{|F|}}\right] \quad (61)$$

$$\frac{\overline{u}^{n+1} - \overline{u}^n}{\Delta t} + [(\overline{u} \cdot \nabla)\overline{u}]^{n+1/2} = -\frac{1}{\rho(\phi^{n+1/2})}\nabla p^{n+1/2} + \frac{1}{\rho(\phi^{n+1/2})\text{Re}}\nabla \cdot \quad (62)$$

$$[2\mu(\phi^{n+1/2})D^{n+1/2}] + \nabla \cdot \tau^{n+1/2} - \frac{1}{\rho(\phi^{n+1/2})\text{We}}[\kappa(\phi)\delta(\phi)\nabla\phi]^{n+1/2}$$

$$\nabla \cdot \overline{u}^{n+1} = 0 \quad (63)$$

$$D^{n+1/2} = \frac{1}{2}(D^n + D^{n+1}) = \frac{1}{2}\left(\frac{1}{2}[\nabla \overline{u} + (\nabla \overline{u})^T]^n + \frac{1}{2}[\nabla \overline{u} + (\nabla \overline{u})^T]^{n+1}\right)$$

$$\overline{u}^{**} = \overline{u}^n + \Delta t\left[-[(\overline{u} \cdot \nabla)\overline{u}]^{n+1/2} - \frac{1}{\rho(\phi^{n+1/2})}\nabla p^{n-1/2} + \nabla \cdot \tau^{n+1/2} + \frac{1}{\rho(\phi^{n+1/2})\text{Re}}\nabla \cdot [\mu(\phi^{n+1/2})D^n] - \frac{1}{\rho(\phi^{n+1/2})\text{We}}[\kappa(\phi)\delta(\phi)\nabla\phi]^{n+1/2}\right] \quad (64)$$

$$\overline{u}^* - \frac{\Delta t}{\rho(\phi^{n+1/2})\text{Re}}\nabla \cdot [\mu(\phi^{n+1/2})D^*] = \overline{u}^{**} \quad (65)$$

$$D^* = \frac{1}{2}[\nabla \overline{u}^* + (\nabla \overline{u}^*)^T] \quad (66)$$

$$\overline{u}^* \leftarrow \overline{u}^* + \frac{\Delta t}{\rho(\phi^{n+1/2})}\nabla p^{n-1/2} \quad (67)$$

$$\overline{u}^{n+1} = \overline{u}^* - \frac{\Delta t}{\rho(\phi^{n+1/2})}\nabla p^{n+1} \quad (68)$$

$$\nabla \cdot \overline{u}^* = \nabla \cdot \left(\frac{\Delta t}{\rho(\phi^{n+1/2})}\nabla p^{n+1/2}\right) \quad (69)$$

$$\frac{\tau^{n+1} - \tau^n}{\Delta t} = [-(\overline{u} \cdot \nabla)\tau + \tau \cdot (\nabla \overline{u}) + (\nabla \overline{u})^T \cdot \tau]^{n+1/2} - \frac{1}{\lambda(\phi^{n+1/2})}\left(\tau^{n+1} - 2\frac{\mu_p(\phi^{n+1/2})}{\text{Re}_p}D^{n+1/2}\right) \quad (70)$$

$$\left(1 + \frac{\Delta t}{\lambda_p(\phi^{n+1/2})}\right)\tau^{n+1} = \quad (71)$$

$$\tau^n + \Delta t[-(\overline{u} \cdot \nabla)\tau + \tau \cdot (\nabla \overline{u}) + (\nabla \overline{u})^T \cdot \tau]^{n+1/2} + \frac{2\Delta t \mu_p(\phi^{n+1/2})}{\lambda(\phi^{n+1/2})\text{Re}_p}D^{n+1/2}$$

$$[(\overline{u} \cdot \nabla)\tau]^{n+1/2}_{i,j} = \frac{u^{n+1/2}_{i+1/2,j} + u^{n+1/2}_{i-1/2,j}}{2}\frac{\tau^{n+1/2}_{i+1/2,j} - \tau^{n+1/2}_{i-1/2,j}}{\Delta r} + \frac{v^{n+1/2}_{i,j+1/2} + v^{n+1/2}_{i,j-1/2}}{2}\frac{\tau^{n+1/2}_{i,j+1/2} - \tau^{n+1/2}_{i,j-1/2}}{\Delta z} \quad (72)$$

$$\tau^{n+1/2,L}_{i+1/2,j} = \tau^n_{i,j} + \frac{\Delta r}{2}\tau^n_{r,i,j} + \frac{\Delta t}{2}\tau^n_{t,i,j} \quad (73)$$

$$= \tau^n_{i,j} + \frac{1}{2}(\Delta r - \Delta t u^n_{i,j})\tau^n_{r,i,j} - \frac{\Delta t}{2}(\hat{v}\hat{\tau}_z)_{i,j} + \frac{\Delta t}{2}G^n_{i,j}$$

$$G^n_{i,j} = \left[\tau \cdot (\nabla \overline{u}) + (\nabla \overline{u})^T \cdot \tau - \frac{1}{\lambda(\phi)}\left(\tau - 2\frac{\mu_p(\phi)}{\text{Re}_p}D\right)\right]^n_{i,j} \quad (74)$$

$$\tau^{n+1/2,R}_{i+1/2,j} = \tau^n_{i+1,j} - \frac{\Delta r}{2}\tau^n_{r,i+1,j} + \frac{\Delta t}{2}\tau^n_{t,i+1,j} \quad (75)$$

$$= \tau^n_{i+1,j} - \frac{1}{2}(\Delta r + \Delta t u^n_{i+1,j})\tau^n_{r,i+1,j} - \frac{\Delta t}{2}(\hat{v}\hat{\tau}_z)_{i+1,j} + \frac{\Delta t}{2}G^n_{i+1,j}$$

$$\tau^{n+1/2}_{i+1/2,j} = \begin{cases} \tau^{n+1/2,L}_{i+1/2,j} & \text{if } u^{n+1/2}_{i+1/2,j} > 0 \\ \tau^{n+1/2,R}_{i+1/2,j} & \text{if } u^{n+1/2}_{i+1/2,j} < 0 \\ \frac{\tau^{n+1/2,L}_{i+1/2,j} + \tau^{n+1/2,R}_{i+1/2,j}}{2} & \text{if } u^{n+1/2}_{i+1/2,j} = 0 \end{cases} \quad (76)$$

$$[\tau \cdot (\nabla \overline{u})]^{n+1/2} = \left(\frac{\partial u}{\partial r}\tau_{rr} + \frac{\partial u}{\partial z}\tau_{rz}\right)^{n+1/2}\hat{e}_r\hat{e}_r + \left(\frac{\partial v}{\partial r}\tau_{rr} + \frac{\partial v}{\partial z}\tau_{rz}\right)^{n+1/2}\hat{e}_r\hat{e}_z + \left(\frac{\partial u}{\partial r}\tau_{rz} + \frac{\partial u}{\partial z}\tau_{zz}\right)^{n+1/2}\hat{e}_z\hat{e}_r + \left(\frac{\partial v}{\partial r}\tau_{rz} + \frac{\partial v}{\partial z}\tau_{zz}\right)^{n+1/2}\hat{e}_z\hat{e}_z + \frac{u^{n+1/2}}{r}\tau^{n+1/2}_{\theta\theta}\hat{e}_\theta\hat{e}_\theta \quad (77)$$

$$\frac{\partial u}{\partial r}\tau_{rr} + \frac{\partial u}{\partial z}\tau_{rz} = \quad (78)$$

APPENDIX-continued $$\frac{u_{i+1/2,j} - u_{i-1/2,j}}{\Delta r} \frac{\tau_{rr,i+1/2,j} + \tau_{rr,i-1/2,j} + \tau_{rr,i,j+1/2} + \tau_{rr,i,j-1/2}}{4} +$$

$$\frac{u_{i,j+1/2} - u_{i,j-1/2}}{\Delta z} \frac{\tau_{rz,i+1/2,j} + \tau_{rz,i-1/2,j} + \tau_{rz,i,j+1/2} + \tau_{rz,i,j-1/2}}{4}$$

$$\frac{\partial v}{\partial r} \tau_{rr} + \frac{\partial v}{\partial z} \tau_{rz} =$$

$$\frac{v_{i+1/2,j} - v_{i-1/2,j}}{\Delta r} \frac{\tau_{rr,i+1/2,j} + \tau_{rr,i-1/2,j} + \tau_{rr,i,j+1/2} + \tau_{rr,i,j-1/2}}{4} +$$

$$\frac{v_{i,j+1/2} - v_{i,j-1/2}}{\Delta z} \frac{\tau_{rz,i+1/2,j} + \tau_{rz,i-1/2,j} + \tau_{rz,i,j+1/2} + \tau_{rz,i,j-1/2}}{4}$$

$$\frac{\partial u}{\partial r} \tau_{rz} + \frac{\partial u}{\partial z} \tau_{zz} =$$

$$\frac{u_{i+1/2,j} - u_{i-1/2,j}}{\Delta r} \frac{\tau_{rz,i+1/2,j} + \tau_{rz,i-1/2,j} + \tau_{rz,i,j+1/2} + \tau_{rz,i,j-1/2}}{4} +$$

$$\frac{u_{i,j+1/2} - u_{i,j-1/2}}{\Delta z} \frac{\tau_{zz,i+1/2,j} + \tau_{zz,i-1/2,j} + \tau_{zz,i,j+1/2} + \tau_{zz,i,j-1/2}}{4}$$

$$\frac{\partial v}{\partial r} \tau_{rz} + \frac{\partial v}{\partial z} \tau_{zz} =$$

$$\frac{v_{i+1/2,j} - v_{i-1/2,j}}{\Delta r} \frac{\tau_{rz,i+1/2,j} + \tau_{rz,i-1/2,j} + \tau_{rz,i,j+1/2} + \tau_{rz,i,j-1/2}}{4} +$$

$$\frac{v_{i,j+1/2} - v_{i,j-1/2}}{\Delta z} \frac{\tau_{zz,i+1/2,j} + \tau_{zz,i-1/2,j} + \tau_{zz,i,j+1/2} + \tau_{zz,i,j-1/2}}{4}$$

$$\frac{u}{r} \tau_{\theta\theta} = \frac{u_{i+1/2,j} + u_{i-1/2,j} + u_{i,j+1/2} + u_{i,j-1/2}}{4 r_{i,j}} \times$$

$$\frac{\tau_{\theta\theta,i+1/2,j} + \tau_{\theta\theta,i-1/2,j} + \tau_{\theta\theta,i,j+1/2} + \tau_{\theta\theta,i,j-1/2}}{4}$$

$$\nabla \cdot \tau^{n+1/2} = \tag{79}$$

$$\left(\frac{\partial \tau_{rr}}{\partial r} + \frac{\partial \tau_{rz}}{\partial z} + \frac{\tau_{rr} - \tau_{\theta\theta}}{r}\right)^{n+1/2} \hat{e}_r + \left(\frac{\partial \tau_{rz}}{\partial r} + \frac{\partial \tau_{zz}}{\partial z} + \frac{\tau_{rz}}{r}\right)^{n+1/2} \hat{e}_z$$

$$\left(\frac{\partial \tau_{rr}}{\partial r}\right)^{n+1/2}_{i,j} = (\tau^{n+1/2}_{rr,i+1/2,j} - \tau^{n+1/2}_{rr,i-1/2,j})/\Delta r \tag{80}$$

$$\left(\frac{\partial \tau_{rz}}{\partial z}\right)^{n+1/2}_{i,j} = (\tau^{n+1/2}_{rz,i,j+1/2} - \tau^{n+1/2}_{rz,i,j-1/2})/\Delta z$$

$$\left(\frac{\partial \tau_{rz}}{\partial r}\right)^{n+1/2}_{i,j} = (\tau^{n+1/2}_{rz,i+1/2,j} - \tau^{n+1/2}_{rz,i-1/2,j})/\Delta r$$

$$\left(\frac{\partial \tau_{zz}}{\partial z}\right)^{n+1/2}_{i,j} = (\tau^{n+1/2}_{zz,i,j+1/2} - \tau^{n+1/2}_{zz,i,j-1/2})/\Delta z$$

$$\left(\frac{\tau^{n+1/2}_{rr} - \tau^{n+1/2}_{\theta\theta}}{r}\right)_{i,j} = \frac{\tau^{n+1/2}_{rr,i+1/2,j} + \tau^{n+1/2}_{rr,i-1/2,j} + \tau^{n+1/2}_{rr,i,j+1/2} + \tau^{n+1/2}_{rr,i,j-1/2}}{4 r_{i,j}} -$$

$$\frac{\tau^{n+1/2}_{\theta\theta,i+1/2,j} + \tau^{n+1/2}_{\theta\theta,i-1/2,j} + \tau^{n+1/2}_{\theta\theta,i,j+1/2} + \tau^{n+1/2}_{\theta\theta,i,j-1/2}}{4 r_{i,j}}$$

What is claimed is:

1. A method using a central processing unit to simulate and analyze flow of a viscoelastic fluid through a channel having an interface between a first fluid that flows through the channel and a second fluid, and a formation of a droplet, the method comprising:

performing calculations using the central processing unit to solve equations, including a momentum equation, governing a viscoelastic flow of the first fluid through the channel, including viscoelastic stress equations that include a normalized relaxation time up to 1000, the calculations being performed to simulate the flow of the first fluid through the channel, wherein the method is stable over a period of time in which a droplet is formed; and updating, periodically during the simulation using the central processing unit, a level set function for the first and second fluids, wherein the level set function describes a position of the interface between the first and second fluids, and an evolution of the level set function over time describes a shape and the position of the interface over time;

wherein each of the performing and updating steps is carried out using a quadrilateral grid finite difference method.

2. A non-transitory computer readable storage medium encoded with instructions for performing the method recited in claim 1.

3. A system including the central processing unit and memory configured to perform the method recited in claim 1.

4. The method of claim 1, further comprising providing a visual display of the level set function.

5. The method of claim 1, further comprising designing an ink-jet print head using results of the simulation of the flow of the viscoelastic fluid.

6. The method of claim 1, wherein the normalized relaxation time is normalized relative to a width of an opening of the channel.

7. The method of claim 1, wherein the normalized relaxation time is normalized relative to a velocity scale.

8. The method of claim 1, wherein the method is performed by an algorithm that is explicit on an advection term, semi-implicit on a viscosity term, and implicit on a relaxation term.

9. The method of claim 8, wherein the advection term is evaluated using a Taylor expansion in both space and time, wherein the viscosity term is extrapolated in space from both the right and the left and a Godunov type upwinding is used to choose which extrapolation is evaluated.

10. The method of claim 8, wherein evaluating the relaxation term implicitly includes modifying a viscoelastic stress equation which describes the evolution of viscoelastic stress over time, wherein:

the viscoelastic stress equation is discretized in time to form a time discretized viscoelastic stress equation that describes the evolution of the viscoelastic stress from a first point in time to a second point in time;

the relaxation term is a function of at least a viscoelastic relaxation time of the first fluid;

a viscoelastic stress tensor is evaluated at the second point in time; and the time discretized viscoelastic stress equation is algebraically modified such that a viscoelastic stress tensor at a second point in time is described relative to a viscoelastic stress tensor at the first point in time.

11. The method of claim 10, wherein the relaxation term is also a function of the level set function.

12. The method of claim 1, wherein the droplet is formed, does not pinch off, and the simulation is stable over a period of time that includes the formation of the droplet, an extension of the droplet above an initial interface, and a retraction of the droplet towards the initial interface.

13. The method of claim 1, wherein a level set projection method is also performed to solve the equations governing the viscoelastic flow of the first fluid.

* * * * *